US010601863B1

(12) United States Patent
Siddiqui

(10) Patent No.: US 10,601,863 B1
(45) Date of Patent: Mar. 24, 2020

(54) SYSTEM AND METHOD FOR MANAGING SENSOR ENROLLMENT

(71) Applicant: FireEye, Inc., Milpitas, CA (US)

(72) Inventor: Mumtaz Siddiqui, Fremont, CA (US)

(73) Assignee: FireEye, Inc., Milpitas, CA (US)

(*) Notice: Subject to any disclaimer, the term of this patent is extended or adjusted under 35 U.S.C. 154(b) by 584 days.

(21) Appl. No.: 15/283,209

(22) Filed: Sep. 30, 2016

Related U.S. Application Data

(60) Provisional application No. 62/313,639, filed on Mar. 25, 2016.

(51) Int. Cl.
H04L 29/06 (2006.01)

(52) U.S. Cl.
CPC ........ H04L 63/145 (2013.01); H04L 63/0876 (2013.01)

(58) Field of Classification Search
CPC .......................... H04L 63/145; H04L 63/0876
See application file for complete search history.

(56) References Cited

U.S. PATENT DOCUMENTS

| 4,292,580 | A | 9/1981 | Ott et al. |
| 5,175,732 | A | 12/1992 | Hendel et al. |
| 5,319,776 | A | 6/1994 | Hile et al. |
| 5,440,723 | A | 8/1995 | Arnold et al. |
| 5,490,249 | A | 2/1996 | Miller |
| 5,657,473 | A | 8/1997 | Killean et al. |
| 5,802,277 | A | 9/1998 | Cowlard |

(Continued)

FOREIGN PATENT DOCUMENTS

| GB | 2439806 A | 1/2008 |
| GB | 2448065 A | 10/2008 |

(Continued)

OTHER PUBLICATIONS

"Mining Specification of Malicious Behavior"—Jha et al, UCSB, Sep. 2007 https://www.cs.ucsb.edu/.about.chris/research/doc/esec07.sub.--mining.pdf-.

(Continued)

Primary Examiner — Joseph P Hirl
Assistant Examiner — Stephen T Gundry
(74) Attorney, Agent, or Firm — Rutan & Tucker, LLP

(57) ABSTRACT

Sensor enrollment management is conducted where features and capabilities for one or more broker computing nodes within the cluster are received by an enrollment service operating within a management system. The enrollment service is configured to receive advertised features and capabilities for computing nodes that are part of a cluster and provide address information associated with the enrollment service to the sensor. Based on information supplied by the sensor, the enrollment service authenticates the sensor, and upon authentication, forwards keying material associated with the sensor to a computing node selected that is selected for supporting communications to the cluster from the sensor. Also, the enrollment service provides a portion of the advertised features and capabilities associated with the computing node to the sensor to enable the sensor to establish a secure communication path with the computing node for malware analysis of suspicious objects within network traffic monitored by the sensor.

32 Claims, 11 Drawing Sheets

(56) References Cited

U.S. PATENT DOCUMENTS

| | | |
|---|---|---|
| 5,828,847 A | 10/1998 | Gehr et al. |
| 5,842,002 A | 11/1998 | Schnurer et al. |
| 5,960,170 A | 9/1999 | Chen et al. |
| 5,978,917 A | 11/1999 | Chi |
| 5,983,348 A | 11/1999 | Ji |
| 6,032,189 A | 2/2000 | Jinzenji et al. |
| 6,088,803 A | 7/2000 | Tso et al. |
| 6,092,194 A | 7/2000 | Touboul |
| 6,094,677 A | 7/2000 | Capek et al. |
| 6,108,799 A | 8/2000 | Boulay et al. |
| 6,154,844 A | 11/2000 | Touboul et al. |
| 6,195,680 B1 | 2/2001 | Goldszmidt et al. |
| 6,269,330 B1 | 7/2001 | Cidon et al. |
| 6,272,641 B1 | 8/2001 | Ji |
| 6,279,113 B1 | 8/2001 | Vaidya |
| 6,298,445 B1 | 10/2001 | Shostack et al. |
| 6,357,008 B1 | 3/2002 | Nachenberg |
| 6,424,627 B1 | 7/2002 | Sorhaug et al. |
| 6,442,696 B1 | 8/2002 | Wray et al. |
| 6,484,315 B1 | 11/2002 | Ziese |
| 6,487,666 B1 | 11/2002 | Shanklin et al. |
| 6,493,756 B1 | 12/2002 | O'Brien et al. |
| 6,550,012 B1 | 4/2003 | Villa et al. |
| 6,775,657 B1 | 8/2004 | Baker |
| 6,831,893 B1 | 12/2004 | Ben Nun et al. |
| 6,832,367 B1 | 12/2004 | Choi et al. |
| 6,895,550 B2 | 5/2005 | Kanchirayappa et al. |
| 6,898,632 B2 | 5/2005 | Gordy et al. |
| 6,907,396 B1 | 6/2005 | Muttik et al. |
| 6,941,348 B2 | 9/2005 | Petry et al. |
| 6,971,097 B1 | 11/2005 | Wallman |
| 6,981,279 B1 | 12/2005 | Arnold et al. |
| 7,007,107 B1 | 2/2006 | Ivchenko et al. |
| 7,028,179 B2 | 4/2006 | Anderson et al. |
| 7,043,757 B2 | 5/2006 | Hoefelmeyer et al. |
| 7,058,822 B2 | 6/2006 | Edery et al. |
| 7,069,316 B1 | 6/2006 | Gryaznov |
| 7,080,407 B1 | 7/2006 | Zhao et al. |
| 7,080,408 B1 | 7/2006 | Pak et al. |
| 7,093,002 B2 | 8/2006 | Wolff et al. |
| 7,093,239 B1 | 8/2006 | van der Made |
| 7,096,498 B2 | 8/2006 | Judge |
| 7,100,201 B2 | 8/2006 | Izatt |
| 7,107,617 B2 | 9/2006 | Hursey et al. |
| 7,159,149 B2 | 1/2007 | Spiegel et al. |
| 7,188,367 B1 | 3/2007 | Edwards et al. |
| 7,213,260 B2 | 5/2007 | Judge |
| 7,231,667 B2 | 6/2007 | Jordan |
| 7,240,364 B1 | 7/2007 | Branscomb et al. |
| 7,240,368 B1 | 7/2007 | Roesch et al. |
| 7,243,371 B1 | 7/2007 | Kasper et al. |
| 7,249,175 B1 | 7/2007 | Donaldson |
| 7,287,278 B2 | 10/2007 | Liang |
| 7,308,716 B2 | 12/2007 | Danford et al. |
| 7,328,453 B2 | 2/2008 | Merkle, Jr. et al. |
| 7,346,486 B2 | 3/2008 | Ivancic et al. |
| 7,356,736 B2 | 4/2008 | Natvig |
| 7,386,888 B2 | 6/2008 | Liang et al. |
| 7,392,542 B2 | 6/2008 | Bucher |
| 7,418,729 B2 | 8/2008 | Szor |
| 7,428,300 B1 | 9/2008 | Drew et al. |
| 7,441,272 B2 | 10/2008 | Durham et al. |
| 7,448,084 B1 | 11/2008 | Apap et al. |
| 7,458,098 B2 | 11/2008 | Judge et al. |
| 7,464,404 B2 | 12/2008 | Carpenter et al. |
| 7,464,407 B2 | 12/2008 | Nakae et al. |
| 7,467,408 B1 | 12/2008 | O'Toole, Jr. |
| 7,478,428 B1 | 1/2009 | Thomlinson |
| 7,480,773 B1 | 1/2009 | Reed |
| 7,487,543 B2 | 2/2009 | Arnold et al. |
| 7,492,780 B1 | 2/2009 | Goolsby |
| 7,496,960 B1 | 2/2009 | Chen et al. |
| 7,496,961 B2 | 2/2009 | Zimmer et al. |
| 7,519,990 B1 | 4/2009 | Xie |
| 7,523,493 B2 | 4/2009 | Liang et al. |
| 7,530,104 B1 | 5/2009 | Thrower et al. |
| 7,540,025 B2 | 5/2009 | Tzadikario |
| 7,546,638 B2 | 6/2009 | Anderson et al. |
| 7,565,550 B2 | 7/2009 | Liang et al. |
| 7,568,233 B1 | 7/2009 | Szor et al. |
| 7,584,455 B2 | 9/2009 | Ball |
| 7,603,715 B2 | 10/2009 | Costa et al. |
| 7,607,171 B1 | 10/2009 | Marsden et al. |
| 7,639,714 B2 | 12/2009 | Stolfo et al. |
| 7,644,438 B1 | 1/2010 | Dash et al. |
| 7,644,441 B2 | 1/2010 | Schmid et al. |
| 7,653,592 B1 | 1/2010 | Flaxman et al. |
| 7,657,419 B2 | 2/2010 | van der Made |
| 7,676,841 B2 | 3/2010 | Sobchuk et al. |
| 7,698,548 B2 | 4/2010 | Shelest et al. |
| 7,707,633 B2 | 4/2010 | Danford et al. |
| 7,712,136 B2 | 5/2010 | Sprosts et al. |
| 7,730,011 B1 | 6/2010 | Deninger et al. |
| 7,739,740 B1 | 6/2010 | Nachenberg et al. |
| 7,779,463 B2 | 8/2010 | Stolfo et al. |
| 7,784,097 B1 | 8/2010 | Stolfo et al. |
| 7,832,008 B1 | 11/2010 | Kraemer |
| 7,836,502 B1 | 11/2010 | Zhao et al. |
| 7,849,506 B1 | 12/2010 | Dansey et al. |
| 7,854,007 B2 | 12/2010 | Sprosts et al. |
| 7,865,614 B2 | 1/2011 | Lu et al. |
| 7,869,073 B2 | 1/2011 | Oshima |
| 7,877,803 B2 | 1/2011 | Enstone et al. |
| 7,904,959 B2 | 3/2011 | Sidiroglou et al. |
| 7,908,660 B2 | 3/2011 | Bahl |
| 7,930,738 B1 | 4/2011 | Petersen |
| 7,937,387 B2 | 5/2011 | Frazier et al. |
| 7,937,760 B2 | 5/2011 | Ross et al. |
| 7,937,761 B1 | 5/2011 | Bennett |
| 7,949,849 B2 | 5/2011 | Lowe et al. |
| 7,971,208 B2 | 6/2011 | Stokes |
| 7,996,556 B2 | 8/2011 | Raghavan et al. |
| 7,996,836 B1 | 8/2011 | McCorkendale et al. |
| 7,996,904 B1 | 8/2011 | Chiueh et al. |
| 7,996,905 B2 | 8/2011 | Arnold et al. |
| 8,006,305 B2 | 8/2011 | Aziz |
| 8,010,667 B2 | 8/2011 | Zhang et al. |
| 8,020,206 B2 | 9/2011 | Hubbard et al. |
| 8,028,338 B1 | 9/2011 | Schneider et al. |
| 8,042,184 B1 | 10/2011 | Batenin |
| 8,045,094 B2 | 10/2011 | Teragawa |
| 8,045,458 B2 | 10/2011 | Alperovitch et al. |
| 8,065,660 B1 | 11/2011 | Tanner et al. |
| 8,069,484 B2 | 11/2011 | McMillan et al. |
| 8,087,086 B1 | 12/2011 | Lai et al. |
| 8,171,553 B2 | 5/2012 | Aziz et al. |
| 8,176,049 B2 | 5/2012 | Deninger et al. |
| 8,176,480 B1 | 5/2012 | Spertus |
| 8,201,246 B1 | 6/2012 | Wu et al. |
| 8,204,984 B1 | 6/2012 | Aziz et al. |
| 8,214,905 B1 | 7/2012 | Doukhvalov et al. |
| 8,220,054 B1 | 7/2012 | Lu |
| 8,220,055 B1 | 7/2012 | Kennedy |
| 8,225,288 B2 | 7/2012 | Miller et al. |
| 8,225,373 B2 | 7/2012 | Kraemer |
| 8,233,882 B2 | 7/2012 | Rogel |
| 8,234,640 B1 | 7/2012 | Fitzgerald et al. |
| 8,234,709 B2 | 7/2012 | Viljoen et al. |
| 8,239,944 B1 | 8/2012 | Nachenberg et al. |
| 8,260,914 B1 | 9/2012 | Ranjan |
| 8,266,091 B1 | 9/2012 | Gubin et al. |
| 8,286,251 B2 | 10/2012 | Eker et al. |
| 8,291,499 B2 | 10/2012 | Aziz et al. |
| 8,302,192 B1 | 10/2012 | Cnudde et al. |
| 8,307,435 B1 | 11/2012 | Mann et al. |
| 8,307,443 B2 | 11/2012 | Wang et al. |
| 8,312,545 B2 | 11/2012 | Tuvell et al. |
| 8,321,936 B1 | 11/2012 | Green et al. |
| 8,321,941 B2 | 11/2012 | Tuvell et al. |
| 8,332,571 B1 | 12/2012 | Edwards, Sr. |
| 8,365,286 B2 | 1/2013 | Poston |
| 8,365,297 B1 | 1/2013 | Parshin et al. |
| 8,370,938 B1 | 2/2013 | Daswani et al. |
| 8,370,939 B2 | 2/2013 | Zaitsev et al. |

(56) References Cited

U.S. PATENT DOCUMENTS

| | | |
|---|---|---|
| 8,375,444 B2 | 2/2013 | Aziz et al. |
| 8,381,299 B2 | 2/2013 | Stolfo et al. |
| 8,402,529 B1 | 3/2013 | Green et al. |
| 8,464,340 B2 | 6/2013 | Ahn et al. |
| 8,468,602 B2 | 6/2013 | McDougal et al. |
| 8,479,174 B2 | 7/2013 | Chiriac |
| 8,479,276 B1 | 7/2013 | Vaystikh et al. |
| 8,479,291 B1 | 7/2013 | Bodke |
| 8,510,827 B1 | 8/2013 | Leake et al. |
| 8,510,828 B1 | 8/2013 | Guo et al. |
| 8,510,842 B2 | 8/2013 | Amit et al. |
| 8,516,478 B1 | 8/2013 | Edwards et al. |
| 8,516,590 B1 | 8/2013 | Ranadive et al. |
| 8,516,593 B2 | 8/2013 | Aziz |
| 8,522,348 B2 | 8/2013 | Chen et al. |
| 8,528,086 B1 | 9/2013 | Aziz |
| 8,533,824 B2 | 9/2013 | Hutton et al. |
| 8,539,582 B1 | 9/2013 | Aziz et al. |
| 8,549,638 B2 | 10/2013 | Aziz |
| 8,555,391 B1 | 10/2013 | Demir et al. |
| 8,561,177 B1 | 10/2013 | Aziz et al. |
| 8,566,476 B2 | 10/2013 | Shifter et al. |
| 8,566,946 B1 | 10/2013 | Aziz et al. |
| 8,584,094 B2 | 11/2013 | Dadhia et al. |
| 8,584,234 B1 | 11/2013 | Sobel et al. |
| 8,584,239 B2 | 11/2013 | Aziz et al. |
| 8,595,834 B2 | 11/2013 | Xie et al. |
| 8,627,476 B1 | 1/2014 | Satish et al. |
| 8,635,696 B1 | 1/2014 | Aziz |
| 8,682,054 B2 | 3/2014 | Xue et al. |
| 8,682,812 B1 | 3/2014 | Ranjan |
| 8,689,333 B2 | 4/2014 | Aziz |
| 8,695,096 B1 | 4/2014 | Zhang |
| 8,713,631 B1 | 4/2014 | Pavlyushchik |
| 8,713,681 B2 | 4/2014 | Silberman et al. |
| 8,726,392 B1 | 5/2014 | McCorkendale et al. |
| 8,739,280 B2 | 5/2014 | Chess et al. |
| 8,776,229 B1 | 7/2014 | Aziz |
| 8,782,788 B2 * | 7/2014 | Krueger ............... G06F 21/566 726/11 |
| 8,782,792 B1 | 7/2014 | Bodke |
| 8,789,172 B2 | 7/2014 | Stolfo et al. |
| 8,789,178 B2 | 7/2014 | Kejriwal et al. |
| 8,793,278 B2 | 7/2014 | Frazier et al. |
| 8,793,787 B2 | 7/2014 | Ismael et al. |
| 8,805,947 B1 | 8/2014 | Kuzkin et al. |
| 8,806,647 B1 | 8/2014 | Daswani et al. |
| 8,832,829 B2 | 9/2014 | Manni et al. |
| 8,850,570 B1 | 9/2014 | Ramzan |
| 8,850,571 B2 | 9/2014 | Staniford et al. |
| 8,862,675 B1 | 10/2014 | Coomer et al. |
| 8,881,234 B2 | 11/2014 | Narasimhan et al. |
| 8,881,271 B2 | 11/2014 | Butler, II |
| 8,881,282 B1 | 11/2014 | Aziz et al. |
| 8,898,788 B1 | 11/2014 | Aziz et al. |
| 8,914,406 B1 * | 12/2014 | Haugsnes ........... H04L 63/1441 707/769 |
| 8,935,779 B2 | 1/2015 | Manni et al. |
| 8,949,257 B2 | 2/2015 | Shifter et al. |
| 8,984,638 B1 | 3/2015 | Aziz et al. |
| 8,990,939 B2 | 3/2015 | Staniford et al. |
| 8,990,944 B1 | 3/2015 | Singh et al. |
| 8,997,219 B2 | 3/2015 | Staniford et al. |
| 9,009,822 B1 | 4/2015 | Ismael et al. |
| 9,009,823 B1 | 4/2015 | Ismael et al. |
| 9,027,135 B1 | 5/2015 | Aziz |
| 9,071,535 B2 | 6/2015 | Chattopadhyay et al. |
| 9,071,638 B1 | 6/2015 | Aziz et al. |
| 9,104,867 B1 | 8/2015 | Thioux et al. |
| 9,106,630 B2 | 8/2015 | Frazier et al. |
| 9,106,694 B2 | 8/2015 | Aziz et al. |
| 9,118,689 B1 * | 8/2015 | Apte ................... H04L 63/104 |
| 9,118,715 B2 | 8/2015 | Staniford et al. |
| 9,159,035 B1 | 10/2015 | Ismael et al. |
| 9,171,160 B2 | 10/2015 | Vincent et al. |
| 9,176,843 B1 | 11/2015 | Ismael et al. |
| 9,189,627 B1 | 11/2015 | Islam |
| 9,195,829 B1 | 11/2015 | Goradia et al. |
| 9,197,664 B1 | 11/2015 | Aziz et al. |
| 9,210,156 B1 * | 12/2015 | Little ................... G06F 16/9535 |
| 9,223,972 B1 | 12/2015 | Vincent et al. |
| 9,223,980 B1 | 12/2015 | Bao |
| 9,225,740 B1 | 12/2015 | Ismael et al. |
| 9,241,010 B1 | 1/2016 | Bennett et al. |
| 9,251,343 B1 | 2/2016 | Vincent et al. |
| 9,262,635 B2 | 2/2016 | Paithane et al. |
| 9,268,936 B2 | 2/2016 | Butler |
| 9,275,229 B2 | 3/2016 | LeMasters |
| 9,282,109 B1 | 3/2016 | Aziz et al. |
| 9,292,686 B2 | 3/2016 | Ismael et al. |
| 9,294,501 B2 | 3/2016 | Mesdaq et al. |
| 9,300,686 B2 | 3/2016 | Pidathala et al. |
| 9,306,960 B1 | 4/2016 | Aziz |
| 9,306,974 B1 | 4/2016 | Aziz et al. |
| 9,311,479 B1 | 4/2016 | Manni et al. |
| 9,342,695 B2 * | 5/2016 | Barkan ................... G06F 21/57 |
| 9,355,247 B1 | 5/2016 | Thioux et al. |
| 9,356,944 B1 | 5/2016 | Aziz |
| 9,363,280 B1 | 6/2016 | Rivlin et al. |
| 9,367,681 B1 | 6/2016 | Ismael et al. |
| 9,398,028 B1 | 7/2016 | Karandikar et al. |
| 9,413,781 B2 | 8/2016 | Cunningham et al. |
| 9,426,071 B1 | 8/2016 | Caldejon et al. |
| 9,430,646 B1 * | 8/2016 | Mushtaq ............ H04L 63/1425 |
| 9,432,389 B1 | 8/2016 | Khalid et al. |
| 9,438,613 B1 | 9/2016 | Paithane et al. |
| 9,438,622 B1 | 9/2016 | Staniford et al. |
| 9,438,623 B1 | 9/2016 | Thioux et al. |
| 9,459,901 B2 | 10/2016 | Jung et al. |
| 9,467,460 B1 | 10/2016 | Otvagin et al. |
| 9,483,644 B1 | 11/2016 | Paithane et al. |
| 9,489,516 B1 | 11/2016 | Lu et al. |
| 9,495,180 B2 | 11/2016 | Ismael |
| 9,497,213 B2 | 11/2016 | Thompson et al. |
| 9,507,935 B2 | 11/2016 | Ismael et al. |
| 9,516,057 B2 | 12/2016 | Aziz |
| 9,519,782 B2 | 12/2016 | Aziz et al. |
| 9,536,091 B2 | 1/2017 | Paithane et al. |
| 9,537,972 B1 | 1/2017 | Edwards et al. |
| 9,560,059 B1 | 1/2017 | Islam |
| 9,565,202 B1 | 2/2017 | Kindlund et al. |
| 9,591,015 B1 | 3/2017 | Amin et al. |
| 9,591,020 B1 | 3/2017 | Aziz |
| 9,594,904 B1 | 3/2017 | Jain et al. |
| 9,594,905 B1 | 3/2017 | Ismael et al. |
| 9,594,912 B1 | 3/2017 | Thioux et al. |
| 9,609,007 B1 | 3/2017 | Rivlin et al. |
| 9,626,509 B1 | 4/2017 | Khalid et al. |
| 9,628,498 B1 | 4/2017 | Aziz et al. |
| 9,628,507 B2 | 4/2017 | Haq et al. |
| 9,633,134 B2 | 4/2017 | Ross |
| 9,635,039 B1 | 4/2017 | Islam et al. |
| 9,641,546 B1 | 5/2017 | Manni et al. |
| 9,654,485 B1 | 5/2017 | Neumann |
| 9,661,009 B1 | 5/2017 | Karandikar et al. |
| 9,661,018 B1 | 5/2017 | Aziz |
| 9,674,298 B1 | 6/2017 | Edwards et al. |
| 9,680,862 B2 | 6/2017 | Ismael et al. |
| 9,690,606 B1 | 6/2017 | Ha et al. |
| 9,690,933 B1 | 6/2017 | Singh et al. |
| 9,690,935 B2 | 6/2017 | Shiffer et al. |
| 9,690,936 B1 | 6/2017 | Malik et al. |
| 9,736,179 B2 * | 8/2017 | Ismael ................... G06F 21/566 |
| 9,740,857 B2 | 8/2017 | Ismael et al. |
| 9,747,446 B1 | 8/2017 | Pidathala et al. |
| 9,756,074 B2 | 9/2017 | Aziz et al. |
| 9,773,112 B1 | 9/2017 | Rathor et al. |
| 9,781,144 B1 | 10/2017 | Otvagin et al. |
| 9,787,700 B1 | 10/2017 | Amin et al. |
| 9,787,706 B1 | 10/2017 | Otvagin et al. |
| 9,792,196 B1 | 10/2017 | Ismael et al. |
| 9,824,209 B1 | 11/2017 | Ismael et al. |
| 9,824,211 B2 | 11/2017 | Wilson |
| 9,824,216 B1 | 11/2017 | Khalid et al. |

(56) References Cited

U.S. PATENT DOCUMENTS

| | | |
|---|---|---|
| 9,825,976 B1 | 11/2017 | Gomez et al. |
| 9,825,989 B1 | 11/2017 | Mehra et al. |
| 9,838,408 B1 | 12/2017 | Karandikar et al. |
| 9,838,411 B1 | 12/2017 | Aziz |
| 9,838,416 B1 | 12/2017 | Aziz |
| 9,838,417 B1 | 12/2017 | Khalid et al. |
| 9,846,776 B1 | 12/2017 | Paithane et al. |
| 9,876,701 B1 | 1/2018 | Caldejon et al. |
| 9,888,016 B1 | 2/2018 | Amin et al. |
| 9,888,019 B1 | 2/2018 | Pidathala et al. |
| 9,910,988 B1 | 3/2018 | Vincent et al. |
| 9,912,644 B2 | 3/2018 | Cunningham |
| 9,912,681 B1 | 3/2018 | Ismael et al. |
| 9,912,684 B1 | 3/2018 | Aziz et al. |
| 9,912,691 B2 | 3/2018 | Mesdaq et al. |
| 9,912,698 B1 | 3/2018 | Thioux et al. |
| 9,916,440 B1 | 3/2018 | Paithane et al. |
| 9,921,978 B1 | 3/2018 | Chan et al. |
| 9,934,376 B1 | 4/2018 | Ismael |
| 9,934,381 B1 | 4/2018 | Kindlund et al. |
| 9,946,568 B1 | 4/2018 | Ismael et al. |
| 9,954,890 B1 | 4/2018 | Staniford et al. |
| 9,973,531 B1 | 5/2018 | Thioux |
| 10,002,252 B2 | 6/2018 | Ismael et al. |
| 10,019,338 B1 | 7/2018 | Goradia et al. |
| 10,019,573 B2 | 7/2018 | Silberman et al. |
| 10,025,691 B1 | 7/2018 | Ismael et al. |
| 10,025,927 B1 | 7/2018 | Khalid et al. |
| 10,027,689 B1 | 7/2018 | Rathor et al. |
| 10,027,690 B2 | 7/2018 | Aziz et al. |
| 10,027,696 B1 | 7/2018 | Rivlin et al. |
| 10,033,747 B1 | 7/2018 | Paithane et al. |
| 10,033,748 B1 | 7/2018 | Cunningham et al. |
| 10,033,753 B1 | 7/2018 | Islam et al. |
| 10,033,759 B1 | 7/2018 | Kabra et al. |
| 10,050,998 B1 | 8/2018 | Singh |
| 10,068,091 B1 | 9/2018 | Aziz et al. |
| 10,075,455 B2 | 9/2018 | Zafar et al. |
| 10,083,302 B1 | 9/2018 | Paithane et al. |
| 10,084,813 B2 | 9/2018 | Eyada |
| 10,089,461 B1 | 10/2018 | Ha et al. |
| 10,097,573 B1 | 10/2018 | Aziz |
| 10,104,102 B1 | 10/2018 | Neumann |
| 10,108,446 B1 | 10/2018 | Steinberg et al. |
| 10,121,000 B1 | 11/2018 | Rivlin et al. |
| 10,122,746 B1 | 11/2018 | Manni et al. |
| 10,133,863 B2 | 11/2018 | Bu et al. |
| 10,133,866 B1 | 11/2018 | Kumar et al. |
| 10,146,810 B2 | 12/2018 | Shiffer et al. |
| 10,148,693 B2 | 12/2018 | Singh et al. |
| 10,165,000 B1 | 12/2018 | Aziz et al. |
| 10,169,585 B1 | 1/2019 | Pilipenko et al. |
| 10,176,321 B2 | 1/2019 | Abbasi et al. |
| 10,181,029 B1 | 1/2019 | Ismael et al. |
| 10,191,861 B1 | 1/2019 | Steinberg et al. |
| 10,192,052 B1 | 1/2019 | Singh et al. |
| 10,198,574 B1 | 2/2019 | Thioux et al. |
| 10,200,384 B1 | 2/2019 | Mushtaq et al. |
| 10,210,329 B1 | 2/2019 | Malik et al. |
| 10,216,927 B1 | 2/2019 | Steinberg |
| 10,218,740 B1 | 2/2019 | Mesdaq et al. |
| 10,242,185 B1 | 3/2019 | Goradia |
| 2001/0005889 A1 | 6/2001 | Albrecht |
| 2001/0047326 A1 | 11/2001 | Broadbent et al. |
| 2002/0018903 A1 | 2/2002 | Kokubo et al. |
| 2002/0038430 A1 | 3/2002 | Edwards et al. |
| 2002/0091819 A1 | 7/2002 | Melchione et al. |
| 2002/0095607 A1 | 7/2002 | Lin-Hendel |
| 2002/0116627 A1 | 8/2002 | Tarbotton et al. |
| 2002/0144156 A1 | 10/2002 | Copeland |
| 2002/0162015 A1 | 10/2002 | Tang |
| 2002/0166063 A1 | 11/2002 | Lachman et al. |
| 2002/0169952 A1 | 11/2002 | DiSanto et al. |
| 2002/0184528 A1 | 12/2002 | Shevenell et al. |
| 2002/0188887 A1 | 12/2002 | Largman et al. |
| 2002/0194490 A1 | 12/2002 | Halperin et al. |
| 2003/0021728 A1 | 1/2003 | Sharpe et al. |
| 2003/0074578 A1 | 4/2003 | Ford et al. |
| 2003/0084318 A1 | 5/2003 | Schertz |
| 2003/0101381 A1 | 5/2003 | Mateev et al. |
| 2003/0115483 A1 | 6/2003 | Liang |
| 2003/0188190 A1 | 10/2003 | Aaron et al. |
| 2003/0191957 A1 | 10/2003 | Hypponen et al. |
| 2003/0200460 A1 | 10/2003 | Morota et al. |
| 2003/0212902 A1 | 11/2003 | van der Made |
| 2003/0229801 A1 | 12/2003 | Kouznetsov et al. |
| 2003/0237000 A1 | 12/2003 | Denton et al. |
| 2004/0003323 A1 | 1/2004 | Bennett et al. |
| 2004/0006473 A1 | 1/2004 | Mills et al. |
| 2004/0015712 A1 | 1/2004 | Szor |
| 2004/0019832 A1 | 1/2004 | Arnold et al. |
| 2004/0047356 A1 | 3/2004 | Bauer |
| 2004/0083408 A1 | 4/2004 | Spiegel et al. |
| 2004/0088581 A1 | 5/2004 | Brawn et al. |
| 2004/0093513 A1 | 5/2004 | Cantrell et al. |
| 2004/0111531 A1 | 6/2004 | Staniford et al. |
| 2004/0117478 A1 | 6/2004 | Triulzi et al. |
| 2004/0117624 A1 | 6/2004 | Brandt et al. |
| 2004/0128355 A1 | 7/2004 | Chao et al. |
| 2004/0165588 A1 | 8/2004 | Pandya |
| 2004/0236963 A1 | 11/2004 | Danford et al. |
| 2004/0243349 A1 | 12/2004 | Greifeneder et al. |
| 2004/0249911 A1 | 12/2004 | Alkhatib et al. |
| 2004/0255161 A1 | 12/2004 | Cavanaugh |
| 2004/0268147 A1 | 12/2004 | Wiederin et al. |
| 2005/0005159 A1 | 1/2005 | Oliphant |
| 2005/0021740 A1 | 1/2005 | Bar et al. |
| 2005/0033960 A1 | 2/2005 | Vialen et al. |
| 2005/0033989 A1 | 2/2005 | Poletto et al. |
| 2005/0049825 A1 | 3/2005 | King et al. |
| 2005/0050148 A1 | 3/2005 | Mohammadioun et al. |
| 2005/0086523 A1 | 4/2005 | Zimmer et al. |
| 2005/0091513 A1 | 4/2005 | Mitomo et al. |
| 2005/0091533 A1 | 4/2005 | Omote et al. |
| 2005/0091652 A1 | 4/2005 | Ross et al. |
| 2005/0108562 A1 | 5/2005 | Khazan et al. |
| 2005/0114663 A1 | 5/2005 | Cornell et al. |
| 2005/0125195 A1 | 6/2005 | Brendel |
| 2005/0149726 A1 | 7/2005 | Joshi et al. |
| 2005/0157662 A1 | 7/2005 | Bingham et al. |
| 2005/0183143 A1 | 8/2005 | Anderholm et al. |
| 2005/0198247 A1 | 9/2005 | Perry et al. |
| 2005/0201297 A1 | 9/2005 | Peikari |
| 2005/0210533 A1 | 9/2005 | Copeland et al. |
| 2005/0238005 A1 | 10/2005 | Chen et al. |
| 2005/0240781 A1 | 10/2005 | Gassoway |
| 2005/0262562 A1 | 11/2005 | Gassoway |
| 2005/0265331 A1 | 12/2005 | Stolfo |
| 2005/0283839 A1 | 12/2005 | Cowburn |
| 2006/0010495 A1 | 1/2006 | Cohen et al. |
| 2006/0015416 A1 | 1/2006 | Hoffman et al. |
| 2006/0015715 A1 | 1/2006 | Anderson |
| 2006/0015747 A1 | 1/2006 | Van de Ven |
| 2006/0021029 A1 | 1/2006 | Brickell et al. |
| 2006/0021054 A1 | 1/2006 | Costa et al. |
| 2006/0031476 A1 | 2/2006 | Mathes et al. |
| 2006/0037079 A1 | 2/2006 | Midgley |
| 2006/0047665 A1 | 3/2006 | Neil |
| 2006/0070130 A1 | 3/2006 | Costea et al. |
| 2006/0075496 A1 | 4/2006 | Carpenter et al. |
| 2006/0095968 A1 | 5/2006 | Portolani et al. |
| 2006/0101516 A1 | 5/2006 | Sudaharan et al. |
| 2006/0101517 A1 | 5/2006 | Banzhof et al. |
| 2006/0117385 A1 | 6/2006 | Mester et al. |
| 2006/0123477 A1 | 6/2006 | Raghavan et al. |
| 2006/0143709 A1 | 6/2006 | Brooks et al. |
| 2006/0149704 A1 | 7/2006 | Wyatt et al. |
| 2006/0150249 A1 | 7/2006 | Gassen et al. |
| 2006/0161983 A1 | 7/2006 | Cothrell et al. |
| 2006/0161987 A1 | 7/2006 | Levy-Yurista |
| 2006/0161989 A1 | 7/2006 | Reshef et al. |
| 2006/0164199 A1 | 7/2006 | Gilde et al. |
| 2006/0173992 A1 | 8/2006 | Weber et al. |
| 2006/0179147 A1 | 8/2006 | Tran et al. |

(56) References Cited

U.S. PATENT DOCUMENTS

| | | |
|---|---|---|
| 2006/0184632 A1 | 8/2006 | Marino et al. |
| 2006/0191010 A1 | 8/2006 | Benjamin |
| 2006/0221956 A1 | 10/2006 | Narayan et al. |
| 2006/0236393 A1 | 10/2006 | Kramer et al. |
| 2006/0242709 A1 | 10/2006 | Seinfeld et al. |
| 2006/0248519 A1 | 11/2006 | Jaeger et al. |
| 2006/0248582 A1 | 11/2006 | Panjwani et al. |
| 2006/0251104 A1 | 11/2006 | Koga |
| 2006/0265637 A1 | 11/2006 | Marriott et al. |
| 2006/0271784 A1 | 11/2006 | Bolosky et al. |
| 2006/0288417 A1 | 12/2006 | Bookbinder et al. |
| 2007/0006288 A1 | 1/2007 | Mayfield et al. |
| 2007/0006313 A1 | 1/2007 | Porras et al. |
| 2007/0011174 A1 | 1/2007 | Takaragi et al. |
| 2007/0016951 A1 | 1/2007 | Piccard et al. |
| 2007/0019286 A1 | 1/2007 | Kikuchi |
| 2007/0033645 A1 | 2/2007 | Jones |
| 2007/0038943 A1 | 2/2007 | FitzGerald et al. |
| 2007/0064689 A1 | 3/2007 | Shin et al. |
| 2007/0074169 A1 | 3/2007 | Chess et al. |
| 2007/0083930 A1 | 4/2007 | Dumont et al. |
| 2007/0094730 A1 | 4/2007 | Bhikkaji et al. |
| 2007/0101435 A1 | 5/2007 | Konanka et al. |
| 2007/0128855 A1 | 6/2007 | Cho et al. |
| 2007/0142030 A1 | 6/2007 | Sinha et al. |
| 2007/0143827 A1 | 6/2007 | Nicodemus et al. |
| 2007/0156895 A1 | 7/2007 | Vuong |
| 2007/0157180 A1 | 7/2007 | Tillmann et al. |
| 2007/0157306 A1 | 7/2007 | Elrod et al. |
| 2007/0168988 A1 | 7/2007 | Eisner et al. |
| 2007/0171824 A1 | 7/2007 | Ruello et al. |
| 2007/0174915 A1 | 7/2007 | Gribble et al. |
| 2007/0192500 A1 | 8/2007 | Lum |
| 2007/0192858 A1 | 8/2007 | Lum |
| 2007/0198275 A1 | 8/2007 | Malden et al. |
| 2007/0208822 A1 | 9/2007 | Wang et al. |
| 2007/0220607 A1 | 9/2007 | Sprosts et al. |
| 2007/0240218 A1 | 10/2007 | Tuvell et al. |
| 2007/0240219 A1 | 10/2007 | Tuvell et al. |
| 2007/0240220 A1 | 10/2007 | Tuvell et al. |
| 2007/0240222 A1 | 10/2007 | Tuvell et al. |
| 2007/0250930 A1 | 10/2007 | Aziz et al. |
| 2007/0256132 A2 | 11/2007 | Oliphant |
| 2007/0271446 A1 | 11/2007 | Nakamura |
| 2007/0282848 A1 | 12/2007 | Kiilerich et al. |
| 2008/0005782 A1 | 1/2008 | Aziz |
| 2008/0018122 A1 | 1/2008 | Zierler et al. |
| 2008/0022205 A1 | 1/2008 | Shinkai et al. |
| 2008/0028463 A1 | 1/2008 | Dagon et al. |
| 2008/0040710 A1 | 2/2008 | Chiriac |
| 2008/0046781 A1 | 2/2008 | Childs et al. |
| 2008/0066179 A1 | 3/2008 | Liu |
| 2008/0072326 A1 | 3/2008 | Danford et al. |
| 2008/0077793 A1 | 3/2008 | Tan et al. |
| 2008/0080518 A1 | 4/2008 | Hoeflin et al. |
| 2008/0086720 A1 | 4/2008 | Lekel |
| 2008/0098476 A1 | 4/2008 | Syversen |
| 2008/0117816 A1 | 5/2008 | Stone et al. |
| 2008/0120722 A1 | 5/2008 | Sima et al. |
| 2008/0134178 A1 | 6/2008 | Fitzgerald et al. |
| 2008/0134334 A1 | 6/2008 | Kim et al. |
| 2008/0141376 A1 | 6/2008 | Clausen et al. |
| 2008/0184367 A1 | 7/2008 | McMillan et al. |
| 2008/0184373 A1 | 7/2008 | Traut et al. |
| 2008/0189787 A1 | 8/2008 | Arnold et al. |
| 2008/0201778 A1 | 8/2008 | Guo et al. |
| 2008/0209557 A1 | 8/2008 | Herley et al. |
| 2008/0215742 A1 | 9/2008 | Goldszmidt et al. |
| 2008/0222729 A1 | 9/2008 | Chen et al. |
| 2008/0243878 A1 | 10/2008 | de Spiegeleer et al. |
| 2008/0263665 A1 | 10/2008 | Ma et al. |
| 2008/0295172 A1 | 11/2008 | Bohacek |
| 2008/0301810 A1 | 12/2008 | Lehane et al. |
| 2008/0307524 A1 | 12/2008 | Singh et al. |
| 2008/0313738 A1 | 12/2008 | Enderby |
| 2008/0320594 A1 | 12/2008 | Jiang |
| 2009/0003317 A1 | 1/2009 | Kasralikar et al. |
| 2009/0007100 A1 | 1/2009 | Field et al. |
| 2009/0013408 A1 | 1/2009 | Schipka |
| 2009/0031423 A1 | 1/2009 | Liu et al. |
| 2009/0036111 A1 | 2/2009 | Danford et al. |
| 2009/0037835 A1 | 2/2009 | Goldman |
| 2009/0044024 A1 | 2/2009 | Oberheide et al. |
| 2009/0044274 A1 | 2/2009 | Budko et al. |
| 2009/0064332 A1 | 3/2009 | Porras et al. |
| 2009/0077666 A1 | 3/2009 | Chen et al. |
| 2009/0083369 A1 | 3/2009 | Marmor |
| 2009/0083855 A1 | 3/2009 | Apap et al. |
| 2009/0089879 A1 | 4/2009 | Wang et al. |
| 2009/0094697 A1 | 4/2009 | Provos et al. |
| 2009/0113425 A1 | 4/2009 | Ports et al. |
| 2009/0125976 A1 | 5/2009 | Wassermann et al. |
| 2009/0126015 A1 | 5/2009 | Monastyrsky et al. |
| 2009/0126016 A1 | 5/2009 | Sobko et al. |
| 2009/0133125 A1 | 5/2009 | Choi et al. |
| 2009/0144823 A1 | 6/2009 | Lamastra et al. |
| 2009/0158430 A1 | 6/2009 | Borders |
| 2009/0172815 A1 | 7/2009 | Gu et al. |
| 2009/0187992 A1 | 7/2009 | Poston |
| 2009/0193293 A1 | 7/2009 | Stolfo et al. |
| 2009/0198651 A1 | 8/2009 | Shiffer et al. |
| 2009/0198670 A1 | 8/2009 | Shiffer et al. |
| 2009/0198689 A1 | 8/2009 | Frazier et al. |
| 2009/0199274 A1 | 8/2009 | Frazier et al. |
| 2009/0199296 A1 | 8/2009 | Xie et al. |
| 2009/0228233 A1 | 9/2009 | Anderson et al. |
| 2009/0241187 A1 | 9/2009 | Troyansky |
| 2009/0241190 A1 | 9/2009 | Todd et al. |
| 2009/0265692 A1 | 10/2009 | Godefroid et al. |
| 2009/0271867 A1 | 10/2009 | Zhang |
| 2009/0274384 A1 | 11/2009 | Jakobovits |
| 2009/0287653 A1 | 11/2009 | Bennett |
| 2009/0300415 A1 | 12/2009 | Zhang et al. |
| 2009/0300761 A1 | 12/2009 | Park et al. |
| 2009/0328185 A1 | 12/2009 | Berg et al. |
| 2009/0328221 A1 | 12/2009 | Blumfield et al. |
| 2010/0005146 A1 | 1/2010 | Drako et al. |
| 2010/0011205 A1 | 1/2010 | McKenna |
| 2010/0017546 A1 | 1/2010 | Poo et al. |
| 2010/0030996 A1 | 2/2010 | Butler, II |
| 2010/0031353 A1 | 2/2010 | Thomas et al. |
| 2010/0037314 A1 | 2/2010 | Perdisci et al. |
| 2010/0043073 A1 | 2/2010 | Kuwamura |
| 2010/0054278 A1 | 3/2010 | Stolfo et al. |
| 2010/0058474 A1 | 3/2010 | Hicks |
| 2010/0064044 A1 | 3/2010 | Nonoyama |
| 2010/0077481 A1 | 3/2010 | Polyakov et al. |
| 2010/0083376 A1 | 4/2010 | Pereira et al. |
| 2010/0115242 A1 | 5/2010 | Yamada |
| 2010/0115621 A1 | 5/2010 | Staniford et al. |
| 2010/0132038 A1 | 5/2010 | Zaitsev |
| 2010/0154056 A1 | 6/2010 | Smith et al. |
| 2010/0180344 A1 | 7/2010 | Malyshev et al. |
| 2010/0192152 A1 | 7/2010 | Miyamoto et al. |
| 2010/0192223 A1 | 7/2010 | Ismael et al. |
| 2010/0202236 A1 | 8/2010 | Kahler et al. |
| 2010/0205279 A1 | 8/2010 | Takakura |
| 2010/0220863 A1 | 9/2010 | Dupaquis et al. |
| 2010/0235831 A1 | 9/2010 | Dittmer |
| 2010/0251104 A1 | 9/2010 | Massand |
| 2010/0281102 A1 | 11/2010 | Chinta et al. |
| 2010/0281541 A1 | 11/2010 | Stolfo et al. |
| 2010/0281542 A1 | 11/2010 | Stolfo et al. |
| 2010/0287260 A1 | 11/2010 | Peterson et al. |
| 2010/0299754 A1 | 11/2010 | Amit et al. |
| 2010/0306173 A1 | 12/2010 | Frank |
| 2011/0004737 A1 | 1/2011 | Greenebaum |
| 2011/0010697 A1 | 1/2011 | Golovkin |
| 2011/0025504 A1 | 2/2011 | Lyon et al. |
| 2011/0041179 A1 | 2/2011 | St Hlberg |
| 2011/0047594 A1 | 2/2011 | Mahaffey et al. |
| 2011/0047620 A1 | 2/2011 | Mahaffey et al. |
| 2011/0055907 A1 | 3/2011 | Narasimhan et al. |
| 2011/0078794 A1 | 3/2011 | Manni et al. |

(56) References Cited

U.S. PATENT DOCUMENTS

| | | |
|---|---|---|
| 2011/0093951 A1 | 4/2011 | Aziz |
| 2011/0099620 A1 | 4/2011 | Stavrou et al. |
| 2011/0099633 A1 | 4/2011 | Aziz |
| 2011/0099635 A1 | 4/2011 | Silberman et al. |
| 2011/0113231 A1 | 5/2011 | Kaminsky |
| 2011/0125778 A1 | 5/2011 | Kubo |
| 2011/0128965 A1 | 6/2011 | Brehm et al. |
| 2011/0131621 A1 | 6/2011 | Brehm et al. |
| 2011/0145918 A1 | 6/2011 | Jung et al. |
| 2011/0145920 A1 | 6/2011 | Mahaffey et al. |
| 2011/0145934 A1 | 6/2011 | Abramovici et al. |
| 2011/0153743 A1 | 6/2011 | Lindner et al. |
| 2011/0167493 A1 | 7/2011 | Song et al. |
| 2011/0167494 A1 | 7/2011 | Bowen et al. |
| 2011/0173213 A1 | 7/2011 | Frazier et al. |
| 2011/0173460 A1 | 7/2011 | Ito et al. |
| 2011/0191341 A1 | 8/2011 | Meyer et al. |
| 2011/0219449 A1 | 9/2011 | St. Neitzel et al. |
| 2011/0219450 A1 | 9/2011 | McDougal et al. |
| 2011/0219451 A1 | 9/2011 | McDougal et al. |
| 2011/0225624 A1 | 9/2011 | Sawhney et al. |
| 2011/0225655 A1 | 9/2011 | Niemela et al. |
| 2011/0231901 A1 | 9/2011 | Nakamura et al. |
| 2011/0247072 A1 | 10/2011 | Staniford et al. |
| 2011/0265182 A1 | 10/2011 | Peinado et al. |
| 2011/0280240 A1 | 11/2011 | Yamagaki et al. |
| 2011/0289582 A1 | 11/2011 | Kejriwal et al. |
| 2011/0302587 A1 | 12/2011 | Nishikawa et al. |
| 2011/0307954 A1 | 12/2011 | Melnik et al. |
| 2011/0307955 A1 | 12/2011 | Kaplan et al. |
| 2011/0307956 A1 | 12/2011 | Yermakov et al. |
| 2011/0314546 A1 | 12/2011 | Aziz et al. |
| 2011/0321124 A1 | 12/2011 | Kisin et al. |
| 2012/0023209 A1* | 1/2012 | Fletcher ............ H04L 12/40195 709/223 |
| 2012/0023593 A1 | 1/2012 | Puder et al. |
| 2012/0054869 A1 | 3/2012 | Yen et al. |
| 2012/0063319 A1 | 3/2012 | Christin et al. |
| 2012/0066698 A1 | 3/2012 | Yanoo |
| 2012/0079596 A1 | 3/2012 | Thomas et al. |
| 2012/0084859 A1 | 4/2012 | Radinsky et al. |
| 2012/0096553 A1 | 4/2012 | Srivastava et al. |
| 2012/0110667 A1 | 5/2012 | Zubrilin et al. |
| 2012/0117652 A1 | 5/2012 | Manni et al. |
| 2012/0121154 A1 | 5/2012 | Xue et al. |
| 2012/0124426 A1 | 5/2012 | Maybee et al. |
| 2012/0174186 A1 | 7/2012 | Aziz et al. |
| 2012/0174196 A1 | 7/2012 | Bhogavilli et al. |
| 2012/0174218 A1 | 7/2012 | McCoy et al. |
| 2012/0198279 A1 | 8/2012 | Schroeder |
| 2012/0204144 A1 | 8/2012 | Fioritoni et al. |
| 2012/0210423 A1 | 8/2012 | Friedrichs et al. |
| 2012/0216244 A1 | 8/2012 | Kumar et al. |
| 2012/0221571 A1 | 8/2012 | Orman |
| 2012/0222121 A1 | 8/2012 | Staniford et al. |
| 2012/0246337 A1 | 9/2012 | Ross |
| 2012/0252439 A1 | 10/2012 | Peterson et al. |
| 2012/0254917 A1 | 10/2012 | Burkitt et al. |
| 2012/0255015 A1 | 10/2012 | Sahita et al. |
| 2012/0255017 A1 | 10/2012 | Sallam |
| 2012/0260342 A1 | 10/2012 | Dube et al. |
| 2012/0266244 A1 | 10/2012 | Green et al. |
| 2012/0278886 A1 | 11/2012 | Luna |
| 2012/0290584 A1 | 11/2012 | De Bona et al. |
| 2012/0297489 A1 | 11/2012 | Dequevy |
| 2012/0323131 A1 | 12/2012 | Ting et al. |
| 2012/0330801 A1 | 12/2012 | McDougal et al. |
| 2012/0331553 A1 | 12/2012 | Aziz et al. |
| 2013/0007883 A1 | 1/2013 | Zaitsev |
| 2013/0014259 A1 | 1/2013 | Gribble et al. |
| 2013/0036472 A1 | 2/2013 | Aziz |
| 2013/0047034 A1 | 2/2013 | Salomon et al. |
| 2013/0047257 A1 | 2/2013 | Aziz |
| 2013/0067023 A1 | 3/2013 | Joy et al. |
| 2013/0074185 A1 | 3/2013 | McDougal et al. |
| 2013/0086684 A1 | 4/2013 | Mohler |
| 2013/0097699 A1 | 4/2013 | Balupari et al. |
| 2013/0097706 A1 | 4/2013 | Titonis et al. |
| 2013/0111587 A1 | 5/2013 | Goel et al. |
| 2013/0117852 A1 | 5/2013 | Stute |
| 2013/0117855 A1 | 5/2013 | Kim et al. |
| 2013/0139264 A1 | 5/2013 | Brinkley et al. |
| 2013/0148158 A1 | 6/2013 | Kanakubo |
| 2013/0160125 A1 | 6/2013 | Likhachev et al. |
| 2013/0160127 A1 | 6/2013 | Jeong et al. |
| 2013/0160130 A1 | 6/2013 | Mendelev et al. |
| 2013/0160131 A1 | 6/2013 | Madou et al. |
| 2013/0167236 A1 | 6/2013 | Sick |
| 2013/0174214 A1 | 7/2013 | Duncan |
| 2013/0185789 A1 | 7/2013 | Hagiwara et al. |
| 2013/0185795 A1 | 7/2013 | Winn et al. |
| 2013/0185798 A1 | 7/2013 | Saunders et al. |
| 2013/0191915 A1 | 7/2013 | Antonakakis et al. |
| 2013/0196649 A1 | 8/2013 | Paddon et al. |
| 2013/0223608 A1 | 8/2013 | Flockhart et al. |
| 2013/0227691 A1 | 8/2013 | Aziz et al. |
| 2013/0246370 A1 | 9/2013 | Bartram et al. |
| 2013/0247186 A1 | 9/2013 | LeMasters |
| 2013/0263122 A1 | 10/2013 | Levijarvi et al. |
| 2013/0263260 A1 | 10/2013 | Mahaffey et al. |
| 2013/0291109 A1 | 10/2013 | Staniford et al. |
| 2013/0298192 A1 | 11/2013 | Kumar et al. |
| 2013/0298243 A1 | 11/2013 | Kumar et al. |
| 2013/0318038 A1 | 11/2013 | Shiffer et al. |
| 2013/0318073 A1 | 11/2013 | Shiffer et al. |
| 2013/0325791 A1 | 12/2013 | Shiffer et al. |
| 2013/0325792 A1 | 12/2013 | Shiffer et al. |
| 2013/0325871 A1 | 12/2013 | Shiffer et al. |
| 2013/0325872 A1 | 12/2013 | Shiffer et al. |
| 2013/0336285 A1 | 12/2013 | Edara et al. |
| 2013/0340080 A1 | 12/2013 | Gostev et al. |
| 2013/0345887 A1 | 12/2013 | Govindan et al. |
| 2014/0007236 A1* | 1/2014 | Krueger .............. G06F 21/552 726/23 |
| 2014/0019962 A1 | 1/2014 | Litty et al. |
| 2014/0032875 A1 | 1/2014 | Butler |
| 2014/0053260 A1 | 2/2014 | Gupta et al. |
| 2014/0053261 A1 | 2/2014 | Gupta et al. |
| 2014/0122569 A1 | 5/2014 | Abel et al. |
| 2014/0130158 A1 | 5/2014 | Wang et al. |
| 2014/0137180 A1 | 5/2014 | Lukacs et al. |
| 2014/0169762 A1 | 6/2014 | Ryu |
| 2014/0179360 A1 | 6/2014 | Jackson et al. |
| 2014/0181131 A1 | 6/2014 | Ross |
| 2014/0189687 A1 | 7/2014 | Jung et al. |
| 2014/0189866 A1 | 7/2014 | Shiffer et al. |
| 2014/0189882 A1 | 7/2014 | Jung et al. |
| 2014/0229221 A1 | 8/2014 | Shih et al. |
| 2014/0237600 A1 | 8/2014 | Silberman et al. |
| 2014/0280245 A1 | 9/2014 | Wilson |
| 2014/0281514 A1 | 9/2014 | Erofeev et al. |
| 2014/0283037 A1 | 9/2014 | Sikorski et al. |
| 2014/0283063 A1 | 9/2014 | Thompson et al. |
| 2014/0310483 A1 | 10/2014 | Bennett |
| 2014/0328204 A1 | 11/2014 | Klotsche et al. |
| 2014/0330976 A1 | 11/2014 | van Bemmel |
| 2014/0337836 A1 | 11/2014 | Ismael |
| 2014/0344926 A1 | 11/2014 | Cunningham et al. |
| 2014/0351935 A1 | 11/2014 | Shao et al. |
| 2014/0380473 A1 | 12/2014 | Bu et al. |
| 2014/0380474 A1 | 12/2014 | Paithane et al. |
| 2015/0007312 A1 | 1/2015 | Pidathala et al. |
| 2015/0089252 A1 | 3/2015 | Chen |
| 2015/0095961 A1 | 4/2015 | Kliger et al. |
| 2015/0096022 A1 | 4/2015 | Vincent et al. |
| 2015/0096023 A1 | 4/2015 | Mesdaq et al. |
| 2015/0096024 A1 | 4/2015 | Haq et al. |
| 2015/0096025 A1 | 4/2015 | Ismael |
| 2015/0100617 A1 | 4/2015 | Diederich et al. |
| 2015/0180764 A1 | 6/2015 | Pacella et al. |
| 2015/0180886 A1 | 6/2015 | Staniford et al. |
| 2015/0181614 A1 | 6/2015 | Mitra et al. |
| 2015/0186645 A1 | 7/2015 | Aziz et al. |

(56) References Cited

U.S. PATENT DOCUMENTS

| | | | |
|---|---|---|---|
| 2015/0189005 A1* | 7/2015 | Dubois | H04L 67/141 709/217 |
| 2015/0199513 A1 | 7/2015 | Ismael et al. | |
| 2015/0199531 A1 | 7/2015 | Ismael et al. | |
| 2015/0199532 A1 | 7/2015 | Ismael et al. | |
| 2015/0220735 A1 | 8/2015 | Paithane et al. | |
| 2015/0222656 A1* | 8/2015 | Haugsnes | G06F 16/24 726/23 |
| 2015/0229656 A1* | 8/2015 | Shieh | H04L 63/1408 726/22 |
| 2015/0236821 A1 | 8/2015 | Degraaf et al. | |
| 2015/0278243 A1 | 10/2015 | Vincent et al. | |
| 2015/0319182 A1* | 11/2015 | Natarajan | G06F 21/53 726/24 |
| 2015/0334511 A1* | 11/2015 | Rivera | G06F 21/44 455/41.2 |
| 2015/0370723 A1* | 12/2015 | Nambiar | G06F 12/121 711/159 |
| 2015/0372980 A1 | 12/2015 | Eyada | |
| 2015/0373036 A1 | 12/2015 | Patne et al. | |
| 2015/0373043 A1* | 12/2015 | Wang | G06F 21/552 706/12 |
| 2016/0004869 A1 | 1/2016 | Ismael et al. | |
| 2016/0006756 A1 | 1/2016 | Ismael et al. | |
| 2016/0044000 A1 | 2/2016 | Cunningham | |
| 2016/0044035 A1* | 2/2016 | Huang | H04L 63/0272 726/4 |
| 2016/0070589 A1 | 3/2016 | Vermeulen et al. | |
| 2016/0099963 A1 | 4/2016 | Mahaffey et al. | |
| 2016/0110544 A1 | 4/2016 | Singla | |
| 2016/0119379 A1* | 4/2016 | Nadkarni | H04L 63/20 726/1 |
| 2016/0127393 A1 | 5/2016 | Aziz et al. | |
| 2016/0191547 A1 | 6/2016 | Zafar et al. | |
| 2016/0191550 A1 | 6/2016 | Ismael et al. | |
| 2016/0197949 A1* | 7/2016 | Nyhuis | H04L 63/1425 713/190 |
| 2016/0212239 A1* | 7/2016 | Das | G06F 21/55 |
| 2016/0261612 A1 | 9/2016 | Mesdaq et al. | |
| 2016/0269427 A1* | 9/2016 | Haugsnes | H04L 63/1441 |
| 2016/0269437 A1 | 9/2016 | McDougal et al. | |
| 2016/0275303 A1* | 9/2016 | Narayanaswamy | G06F 21/6218 |
| 2016/0285914 A1 | 9/2016 | Singh et al. | |
| 2016/0294829 A1* | 10/2016 | Angus | H04L 63/0876 |
| 2016/0301703 A1 | 10/2016 | Aziz | |
| 2016/0335110 A1 | 11/2016 | Paithane et al. | |
| 2017/0083703 A1 | 3/2017 | Abbasi et al. | |
| 2017/0085565 A1* | 3/2017 | Sheller | H04L 63/0876 |
| 2017/0093897 A1 | 3/2017 | Cochin et al. | |
| 2017/0164218 A1 | 6/2017 | Ni et al. | |
| 2017/0180421 A1* | 6/2017 | Shieh | H04L 63/10 |
| 2017/0250997 A1* | 8/2017 | Rostamabadi | H04L 63/145 |
| 2017/0251013 A1* | 8/2017 | Kirti | H04L 63/1416 |
| 2017/0257767 A1* | 9/2017 | Zhao | H04W 4/70 |
| 2018/0013770 A1 | 1/2018 | Ismael | |
| 2018/0027006 A1* | 1/2018 | Zimmermann | H04L 63/0245 726/11 |
| 2018/0048660 A1 | 2/2018 | Paithane et al. | |
| 2018/0121316 A1 | 5/2018 | Ismael et al. | |
| 2018/0144128 A1* | 5/2018 | Hakuta | G06F 9/54 |
| 2018/0227627 A1* | 8/2018 | Jabara | H04N 21/41407 |
| 2018/0288077 A1* | 10/2018 | Siddiqui | H04L 63/1416 |
| 2018/0293111 A1 | 10/2018 | Chen et al. | |
| 2018/0295508 A1* | 10/2018 | Kyllonen | H04W 76/14 |
| 2018/0367560 A1* | 12/2018 | Mahaffey | H04L 41/142 |
| 2019/0109849 A1* | 4/2019 | Frempong | H04L 63/10 |

FOREIGN PATENT DOCUMENTS

| | | |
|---|---|---|
| GB | 2490431 A | 10/2012 |
| WO | 0206928 A2 | 1/2002 |
| WO | 02/23805 A2 | 3/2002 |
| WO | 2007117636 A2 | 10/2007 |
| WO | 2008/041950 A2 | 4/2008 |
| WO | 2011/084431 A2 | 7/2011 |
| WO | 2011/112348 A1 | 9/2011 |
| WO | 2012/075336 A1 | 6/2012 |
| WO | 2012/145066 A1 | 10/2012 |
| WO | 2013/067505 A1 | 5/2013 |

OTHER PUBLICATIONS

"Network Security: NetDetector—Network Intrusion Forensic System (NIFS) Whitepaper", ("NetDetector Whitepaper"), (2003).

"When Virtual is Better Than Real", IEEEXplore Digital Library, available at, http://ieeexplore.ieee.org/xpl/articleDetails.iso?reload=true&arnumber=990073, (Dec. 7, 2013).

Abdullah, et al., Visualizing Network Data for Intrusion Detection, 2005 IEEE Workshop on Information Assurance and Security, pp. 100-108.

Adetoye, Adedayo, et al., "Network Intrusion Detection & Response System", ("Adetoye") (Sep. 2003).

Apostolopoulos, George; hassapis, Constantinos; "V-eM: A cluster of Virtual Machines for Robust, Detailed, and High-Performance Network Emulation", 14th IEEE International Symposium on Modeling, Analysis, and Simulation of Computer and Telecommunication Systems, Sep. 11-14, 2006, pp. 117-126.

Aura, Tuomas, "Scanning electronic documents for personally identifiable information", Proceedings of the 5th ACM workshop on Privacy in electronic society. ACM, 2006.

Baecher, "The Nepenthes Platform: An Efficient Approach to collect Malware", Springer-verlaq Berlin Heidelberg, (2006), pp. 165-184.

Bayer, et al., "Dynamic Analysis of Malicious Code", J Comput Virol, Springer-Verlag, France., (2006), pp. 67-77.

Boubalos, Chris , "extracting syslog data out of raw pcap dumps, seclists.org, Honeypots mailing list archives", available at http://seclists.org/honeypots/2003/q2/319 ("Boubalos"), (Jun. 5, 2003).

Chaudet, C. , et al., "Optimal Positioning of Active and Passive Monitoring Devices", International Conference on Emerging Networking Experiments and Technologies, Proceedings of the 2005 ACM Conference on Emerging Network Experiment and Technology, CoNEXT '05, Toulousse, France, (Oct. 2005), pp. 71-82.

Chen, P. M. and Noble, B. D., "When Virtual is Better Than Real, Department of Electrical Engineering and Computer Science", University of Michigan ("Chen") (2001).

Cisco "Intrusion Prevention for the Cisco ASA 5500-x Series" Data Sheet (2012).

Cohen, M.I. , "PyFlag—An advanced network forensic framework", Digital investigation 5, Elsevier, (2008), pp. S112-S120.

Costa, M. , et al., "Vigilante: End-to-End Containment of Internet Worms", SOSP '05, Association for Computing Machinery, Inc., Brighton U.K., (Oct. 23-26, 2005).

Didier Stevens, "Malicious PDF Documents Explained", Security & Privacy, IEEE, IEEE Service Center, Los Alamitos, CA, US, vol. 9, No. 1, Jan. 1, 2011, pp. 80-82, XP011329453, ISSN: 1540-7993, DOI: 10.1109/MSP.2011.14.

Distler, "Malware Analysis: An Introduction", SANS Institute InfoSec Reading Room, SANS Institute, (2007).

Dunlap, George W. , et al., "ReVirt: Enabling Intrusion Analysis through Virtual-Machine Logging and Replay", Proceeding of the 5th Symposium on Operating Systems Design and Implementation, USENIX Association, ("Dunlap"), (Dec. 9, 2002).

FireEye Malware Analysis & Exchange Network, Malware Protection System, FireEye Inc., 2010.

FireEye Malware Analysis, Modern Malware Forensics, FireEye Inc., 2010.

FireEye v.6.0 Security Target, pp. 1-35, Version 1.1, FireEye Inc., May 2011.

Goel, et al., Reconstructing System State for Intrusion Analysis, Apr. 2008 SIGOPS Operating Systems Review, vol. 42 Issue 3, pp. 21-28.

Gregg Keizer: "Microsoft's HoneyMonkeys Show Patching Windows Works", Aug. 8, 2005, XP055143386, Retrieved from the

(56) References Cited

OTHER PUBLICATIONS

Internet: URL:http://www.informationweek.com/microsofts-honeymonkeys-show-patching-windows-works/d/d-id/1035069? [retrieved on Jun. 1, 2016].
Heng Yin et al, Panorama: Capturing System-Wide Information Flow for Malware Detection and Analysis, Research Showcase @ CMU, Carnegie Mellon University, 2007.
Hiroshi Shinotsuka, Malware Authors Using New Techniques to Evade Automated Threat Analysis Systems, Oct. 26, 2012, http://www.symantec.com/connect/blogs/, pp. 1-4.
Idika et al., A-Survey-of-Malware-Detection-Techniques, Feb. 2, 2007, Department of Computer Science, Purdue University.
Isohara, Takamasa, Keisuke Takemori, and Ayumu Kubota. "Kernel-based behavior analysis for android malware detection." Computational intelligence and Security (CIS), 2011 Seventh International Conference on. IEEE, 2011.
Kaeo, Merike , "Designing Network Security", ("Kaeo"), (Nov. 2003).
Kevin A Roundy et al: "Hybrid Analysis and Control of Malware", Sep. 15, 2010, Recent Advances in Intrusion Detection, Springer Berlin Heidelberg, Berlin, Heidelberg, pp. 317-338, XP019150454 ISBN:978-3-642-15511-6.
Khaled Salah et al: "Using Cloud Computing to Implement a Security Overlay Network", Security & Privacy, IEEE, IEEE Service Center, Los Alamitos, CA, US, vol. 11, No. 1, Jan. 1, 2013 (Jan. 1, 2013).
Kim, H. , et al., "Autograph: Toward Automated, Distributed Worm Signature Detection", Proceedings of the 13th Usenix Security Symposium (Security 2004), San Diego, (Aug. 2004), pp. 271-286.
King, Samuel T., et al., "Operating System Support for Virtual Machines", ("King"), (2003).
Kreibich, C. , et al., "Honeycomb-Creating Intrusion Detection Signatures Using Honeypots", 2nd Workshop on Hot Topics in Networks (HotNets-11), Boston, USA, (2003).
Kristoff, J. , "Botnets, Detection and Mitigation: DNS-Based Techniques", NU Security Day, (2005), 23 pages.
Lastline Labs, The Threat of Evasive Malware, Feb. 25, 2013, Lastline Labs, pp. 1-8.
Li et al., A VMM-Based System Call Interposition Framework for Program Monitoring, Dec. 2010, IEEE 16th International Conference on Parallel and Distributed Systems, pp. 706-711.
Lindorfer, Martina, Clemens Kolbitsch, and Paolo Milani Comparetti. "Detecting environment-sensitive malware." Recent Advances in Intrusion Detection. Springer Berlin Heidelberg, 2011.
Marchette, David J., "Computer Intrusion Detection and Network Monitoring: a Statistical Viewpoint", ("Marchette"), (2001).
Moore, D. , et al., "Internet Quarantine: Requirements for Containing Self-Propagating Code", INFOCOM, vol. 3, (Mar. 30-Apr. 3, 2003), pp. 1901-1910.
Morales, Jose A., et al., ""Analyzing and exploiting network behaviors of malware."", Security and Privacy in Communication Networks. Springer Berlin Heidelberg, 2010. 20-34.
Mori, Detecting Unknown Computer Viruses, 2004, Springer-Verlag Berlin Heidelberg.
Natvig, Kurt , "SANDBOXII: Internet", Virus Bulletin Conference, ("Natvig"), (Sep. 2002).
NetBIOS Working Group. Protocol Standard for a NetBIOS Service on a TCP/UDP transport: Concepts and Methods. STD 19, RFC 1001, Mar. 1987.
Newsome, J. , et al., "Dynamic Taint Analysis for Automatic Detection, Analysis, and Signature Generation of Exploits on Commodity Software", In Proceedings of the 12th Annual Network and Distributed System Security, Symposium (NDSS '05), (Feb. 2005).
Nojiri, D. , et al., "Cooperation Response Strategies for Large Scale Attack Mitigation", DARPA Information Survivability Conference and Exposition, vol. 1, (Apr. 22-24, 2003), pp. 293-302.
Oberheide et al., CloudAV.sub.--N-Version Antivirus in the Network Cloud, 17th USENIX Security Symposium USENIX Security '08 Jul. 28-Aug. 1, 2008 San Jose, CA.
Reiner Sailer, Enriquillo Valdez, Trent Jaeger, Roonald Perez, Leendert van Doorn, John Linwood Griffin, Stefan Berger., sHype: Secure Hypervisor Appraoch to Trusted Virtualized Systems (Feb. 2, 2005) ("Sailer").
Silicon Defense, "Worm Containment in the Internal Network", (Mar. 2003), pp. 1-25.
Singh, S. , et al., "Automated Worm Fingerprinting", Proceedings of the ACM/USENIX Symposium on Operating System Design and Implementation, San Francisco, California, (Dec. 2004).
Thomas H. Ptacek, and Timothy N. Newsham , "Insertion, Evasion, and Denial of Service: Eluding Network Intrusion Detection", Secure Networks, ("Ptacek"), (Jan. 1998).
U.S. Appl. No. 15/283,108, filed Sep. 30, 2016 Advisory Action dated Nov. 16, 2018.
U.S. Appl. No. 15/283,108, filed Sep. 30, 2016 Final Office Action dated Jul. 26, 2018.
U.S. Appl. No. 15/283,108, filed Sep. 30, 2016 Non-Final Office Action dated Feb. 23, 2018.
U.S. Appl. No. 15/283,108, filed Sep. 30, 2016 Non-Final Office Action dated Mar. 7, 2019.
U.S. Appl. No. 15/283,126, filed Sep. 30, 2016 Non-Final Office Actiong dated Sep. 7, 2018.
U.S. Appl. No. 15/283,126, filed Sep. 30, 2016 Notice of Allowance dated Mar. 4, 2019.
U.S. Appl. No. 15/283,128, filed Sep. 30, 2016 Non-Final Office Action dated Mar. 7, 2019.
Venezia, Paul , "NetDetector Captures Intrusions", InfoWorld Issue 27, ("Venezia"), (Jul. 14, 2003).
Vladimir Getov: "Security as a Service in Smart Clouds—Opportunities and Concerns", Computer Software and Applications Conference (COMPSAC), 2012 IEEE 36th Annual, IEEE, Jul. 16, 2012 (Jul. 16, 2012).
Wahid et al., Characterising the Evolution in Scanning Activity of Suspicious Hosts, Oct. 2009, Third International Conference on Network and System Security, pp. 344-350.
Whyte, et al., "DNS-Based Detection of Scanning Works in an Enterprise Network", Proceedings of the 12th Annual Network and Distributed System Security Symposium, (Feb. 2005), 15 pages.
Williamson, Matthew M., "Throttling Viruses: Restricting Propagation to Defeat Malicious Mobile Code", ACSAC Conference, Las Vegas, NV, USA, (Dec. 2002), pp. 1-9.
Yuhei Kawakoya et al: "Memory behavior-based automatic malware unpacking in stealth debugging environment", Malicious and Unwanted Software (Malware), 2010 5th International Conference on, IEEE, Piscataway, NJ, USA, Oct. 19, 2010, pp. 39-46, XP031833827, ISBN:978-1-4244-8-9353-1.
Zhang et al., The Effects of Threading, Infection Time, and Multiple-Attacker Collaboration on Malware Propagation, Sep. 2009, IEEE 28th International Symposium on Reliable Distributed Systems, pp. 73-82.

\* cited by examiner

SYSTEM AND METHOD FOR MANAGING SENSOR ENROLLMENT

CROSS REFERENCE TO RELATED APPLICATIONS

This application claims the benefit of priority on U.S. Provisional Patent Application No. 62/313,639, filed Mar. 25, 2016, the entire contents of which are incorporated by references.

FIELD

Embodiments of the disclosure relate to the field of cybersecurity. More specifically, one embodiment of the disclosure relates to management of a malware detection system that is configured to detect the presence of malicious objects within monitored data.

GENERAL BACKGROUND

Over the last decade, cybersecurity attacks have become a pervasive problem for internet users as many networked devices and other resources have been subjected to attack and compromised. The attack may involve the infiltration of malicious software onto a network device or concentration on an exploit residing within a network device to perpetrate the cybersecurity attack (generally referred to as "malware").

Recently, malware detection has undertaken three different approaches. One approach involves the installation of anti-virus software within network devices forming an enterprise network. Given that advanced malware is able to circumvent anti-virus analysis, this approach has been determined to be deficient.

Another approach involves the placement of dedicated malware detection appliances at various ingress points throughout a network or subnetwork. The malware detection appliances are configured to extract information propagating over the network at the ingress point, analyze the information to determine a level of suspiciousness, and conduct malware analysis internally within the appliance itself. While successful in detecting advanced malware that is attempting to infect network devices connected to the network (or subnetwork), as network traffic increases, this appliance-based approach may exhibit resource constraints. Stated differently, the dedicated, malware detection appliance has a prescribed (and finite) amount of resources (for example, bandwidth and processing power) that, once fully in use, requires either the malware detection appliance to resort to more selective traffic inspection or additional (and/or upscaled) malware detection appliances to be installed. The later solution requires a large outlay of capital and network downtime, as IT resources are needed to install the new malware detection appliances. Also, these dedicated, malware detection appliances provide limited scalability and flexibility in deployment.

Yet another approach involves the use of exclusive, cloud-based malware detection appliances. However, this exclusive cloud-based solution suffers from a number of disadvantages, including the inability of providing on-site deployment of resources at an enterprise's premises (e.g., as devices that are part of the enterprise's network infrastructure). On-site deployment may be crucial for compliance with requirements as to personally identifiable information (PII) and other sensitive information including those mandated at local, state, country or regional governmental levels.

For each of these malware detection approaches, the management of any scalable cybersecurity system is paramount, as any vulnerability in such management may be exploited.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

Figure 1A:
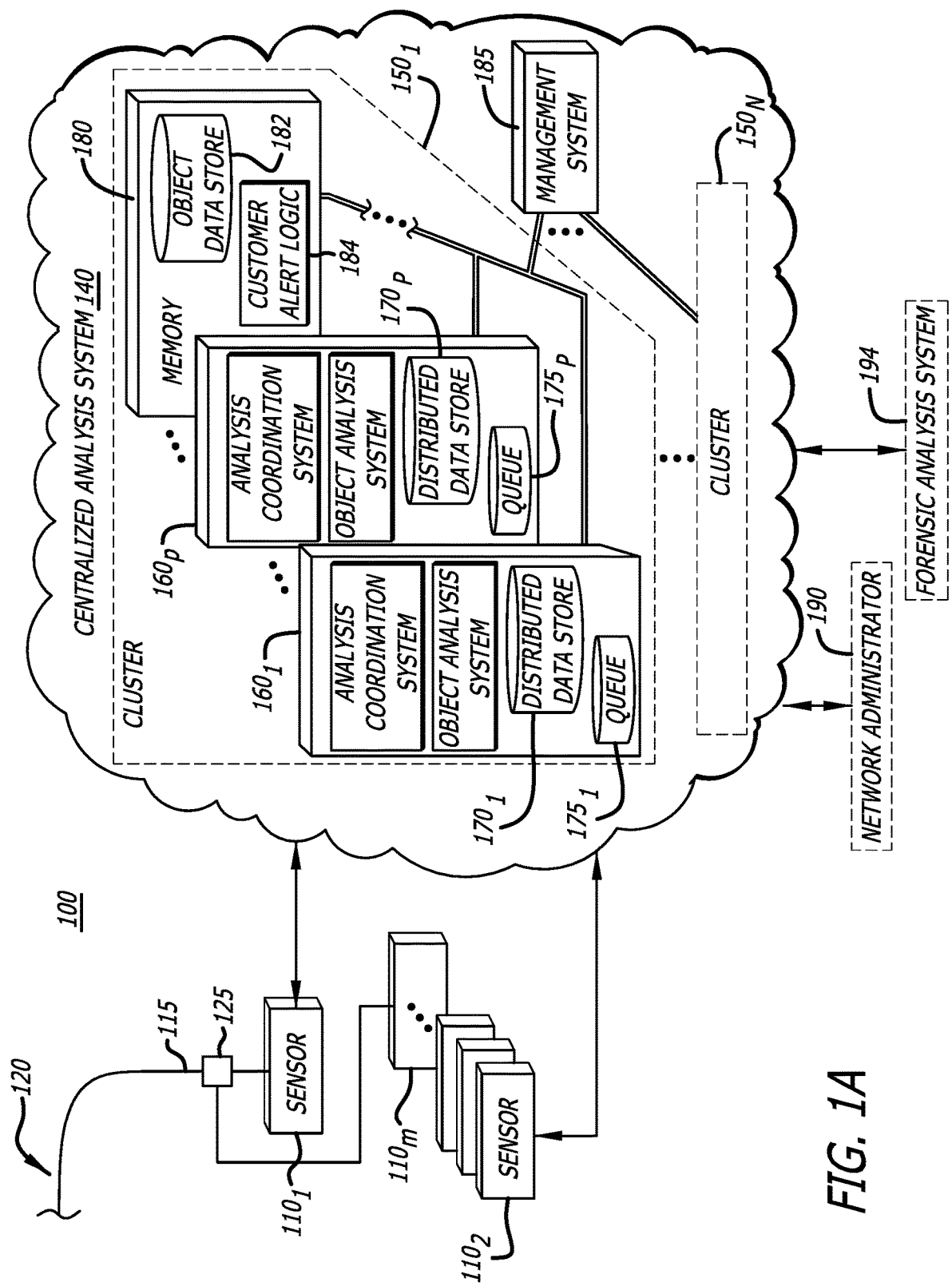
FIG. 1A is a block diagram of an exemplary embodiment of a malware detection system.

Embodiments of the present disclosure generally relate to a management architecture that is adapted to configure and manage operability of a scalable, malware detection system, which is responsible for detecting the presence of malicious objects within monitored data. The malware detection system includes one or more sensors and at least one cluster of computing nodes that is communicatively coupled to the sensors. The management architecture is configured to, at least in part, control (i) cluster formation within the malware detection system, (ii) the assignment (registration) of sensors to a particular cluster through an enrollment service, and (iii) the monitoring of operability for each cluster and/or computing node within the malware detection system.

Once the malware detection system is in operation, each sensor is configured to receive intercepted or copied information that is propagating over a network, conduct an optional preliminary evaluation of at least a portion of the information, and provide at least a portion of the evaluated information to a cluster of computing nodes assigned to the sensor(s). The portion of evaluated information may include an object, and the preliminary evaluation may involve a determination as to whether the object is suspicious, namely whether the object should be provided to the assigned cluster for an in-depth malware analysis. Examples of an "object" may include content having a logical structure or organization that enables it to be classified for purposes of analysis for malware. Examples of this content may include, but is not limited or restricted to an executable (e.g., an application, program, code segment, a script, dynamic link library "dll" or any file in a format that can be directly executed by a computer such as a file with an ".exe" extension, etc.), a non-executable (e.g., a storage file; any document such as a Portable Document Format "PDF" document; a word processing document such as Word® document; an electronic mail "email" message, URL, web page, etc.), or simply collection of related data. The object may be retrieved from information in transit (e.g., a plurality of packets) or information at rest (e.g., data bytes from a storage medium).

In operation, each cluster is of a scalable architecture that includes at least one computing node and allows for additional computing nodes to be added as the network traffic increases or for computing nodes to be removed as network traffic decreases. Highly scalable in number based on network load, a cluster of computing nodes is configured to (i) analyze data content (e.g., suspicious objects) received from a sensor that was assigned to that cluster during enrollment, and (ii) determine whether the likelihood of the object being associated with malware exceeds a prescribed threshold. If so, the object is deemed to be "malicious". The formation of a cluster is, at least, partially controlled in accordance with a management system, as described below.

Herein, the cluster formation involves an exchange of authentication credentials with each of the computing nodes that are to be part of the cluster, an assignment of an identifier for the cluster, and an assignment of role responsibility for each of the computing nodes forming the cluster. Herein, the credential exchange occurs between the management system and each computing node requesting to join a cluster. More specifically, when requesting to join a cluster of the malware detection system, a computing node uploads its authentication credentials to the management system. The authentication credentials may include, but are not limited or restricted to information that identifies the computing node and may be used for authentication, including a public key (PUK). Additionally, or in the alternative, the authentication credentials may include an identifier for the computing node (e.g., source media access control "MAC" address, assigned device name, etc.), an Internet Protocol (IP) address of the computing node, and/or an administrator password (in the event that requisite permission is needed from a network administrator for creating a cluster).

In response to receipt of the authentication credentials, if no cluster has been formed, the management system assigns the computing node to a cluster and adds the PUK of the computing node to a stored listing of public keys (hereinafter "public key listing") for that cluster. The public key listing identifies all of the computing nodes that are part of the cluster. Thereafter, the management system provides the public key listing to the computing node. It is contemplated that, where the submission of the authentication credentials cause the creation of a cluster (i.e., the authentication credentials correspond to a first computing node for a cluster), the management system may assign an identifier (e.g., string of alphanumeric characters that represent the cluster name) to that cluster. The cluster identifier may be returned with the public key listing as well.

In response to receipt of the authentication credentials, when one or more clusters have been formed, the management system analyzes cluster workload, especially where the malware detection system includes a plurality of clusters. Based on the analyzed workload, the management system assigns the computing node to a selected cluster and adds the PUK of the computing node to the public key listing associated with the selected cluster. Thereafter, the management system notifies the current computing nodes of the selected cluster of a change in the public key listing, which may represent expansion or contraction of the cluster. This notification may be accomplished by sending notification messages including the public key listing (i.e., link or listing itself) to each of the computing nodes that are part of the selected cluster. These notification messages may be sent concurrently (e.g., conducted at least partially at the same time). Alternatively, the notification messages may be sent concurrently, but the messages merely notify the computing nodes of an updated publication of the public key listing that is available for retrieval by the computing nodes.

As a result, each of the computing nodes currently forming the cluster, including the computing node that initially provided the PUK, has access to at least public key information associated with all other computing nodes within the cluster. Additionally, the management system may utilize a portion of the authentication credentials (e.g., the PUK) to establish a secure channel with the computing node. One type of secure channel is formed in accordance with a cryptographic, public-private key exchange protocol referred to as "Secure Shell" (SSH-2). The secure channel is used in the transmission of information between the management system and the computing nodes.

The formation of the cluster further involves an assignment of role responsibility for each of the computing nodes forming the cluster. Herein, the management system may configure each computing node as either a "broker" computing node or an "analytic" computing node. As each computing node includes, at least in some embodiments, an analysis coordination system and an object analysis system, the management system may configure a computing node as a "broker" computing node by enabling its analysis coordination system. Similarly, the management system may configure a computing node as an "analytic" computing node by disabling (or refraining from enabling) its analysis coordination system. Each cluster includes at least one "broker" computing node.

For instance, when the analysis coordination system is activated, the computing node is configured to operate as a "broker" computing node, namely a network device that is selected to directly communicate with sensors that are assigned to use the cluster for more in-depth malware analysis of a suspicious object. As a "broker" computing node, the analysis coordination system may be responsible for, inter alia, (i) assigning a unique identifier to a suspicious object, and (ii) distributing the metadata associated with the suspicious object to a distributed data store, where at least a portion of the metadata may be used to locate and retrieve the suspicious object for malware analysis.

Independent of its role ("broker" or "analytic"), each computing node includes an active, object analysis system. The object analysis system is configured to conduct in-depth malware analysis on the suspicious object. Hence, although the analysis coordination system of the "analytic" computing node is inactive, the "analytic" computing node is still able to analyze an incoming object to determine whether that object is associated with malware (i.e. a malicious object).

Sensor registration involves a communication scheme where one or more sensors establish communications with an enrollment service, which may be configured as (i) a daemon application running on the management system or (ii) an enrollment engine that is operating within a public or private cloud. The enrollment service provides an IP address or user name of a particular broker computing node assigned to communicate with the sensor that requested a communicative coupling to a cluster of the malware detection system. The selection of the broker computing node may be based on geographical location of the sensor, subscription level of the customer to which the sensor pertains, workload of the broker computing nodes of the cluster, type of objects analyzed by the particular broker computing node (where certain nodes are dedicated to analysis certain object types (e.g., webpage/URL, emails), type of guest-images supported where different computing nodes may support guest images directed to a single application version/operating system version (e.g., Microsoft® Word 2013 and Windows® 7 OS), multiple (two or more) application versions and a single OS version (e.g., Microsoft® Words® applications supported by Windows® 10 OS), multiple application versions and multiple OS versions (e.g., Microsoft® Words® applications supported by Windows®-based OSes or MAC OS X), single application and multiple OS types, or other information stored in a persistent matter. Upon receipt of the IP address (or user name) of the broker computing node, the sensor establishes direct communications with that particular broker computing node to send metadata for use in establishing secure communication paths (e.g., secure tunnels) with a computing node by which suspicious objects are to be analyzed for malware. The computing node for analysis may be the broker computing node or an analytic computing node.

After one or more clusters (sometimes referred to as "cluster(s)") of the malware detection system have been formulated and the sensor(s) are communicatively coupled to the cluster(s), the management system may be configured to monitor operability of the cluster(s) and/or each computing node of the cluster(s). Such monitoring of computing node operability may include, but is not limited or restricted to monitoring hardware functionality (e.g., fan speed, processor speed, etc.), monitoring workload (e.g., processor utilization, queue capacity, etc.), monitoring compliance with a prescribed software configuration, or the like. Similarly, the monitoring of cluster operability may include monitoring of the cluster workload based on an aggregate of each computing node workload, monitoring compliance with usage of a particular version of a guest image bundle by each computing node forming the cluster, or the like.

I. Terminology

In the following description, certain terminology is used to describe features of the invention. In certain situations, both terms "node" and "system" are representative of hardware, firmware and/or software that is configured to perform one or more functions. In particular, the terms "computing node," "sensor" and/or "management system" are representative of hardware, firmware and/or software that is configured to perform one or more functions. As hardware, the computing node and/or management system may include circuitry having data processing or storage functionality. Examples of such circuitry may include, but are not limited or restricted to a microprocessor, one or more processor cores, a programmable gate array, a microcontroller, an application specific integrated circuit, wireless receiver, transmitter and/or transceiver circuitry, semiconductor memory, or combinatorial logic.

Alternatively, or in combination with the hardware circuitry described above, the management system or sensor may be software in the form of one or more software modules, such as executable code in the form of an executable application, an application programming interface (API), a subroutine, a function, a procedure, an applet, a servlet, a routine, source code, object code, a shared library/ dynamic load library, or one or more instructions. These software modules may be stored in any type of a suitable non-transitory storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the executable code is stored in persistent storage.

The term "computerized" generally represents that any corresponding operations are conducted by hardware in combination with software and/or firmware.

The term "message" generally refers to information in a prescribed format and transmitted in accordance with a suitable delivery protocol such as Hypertext Transfer Protocol (HTTP), HTTP Secure (HTTPS), Simple Mail Transfer Protocol (SMTP), iMESSAGE, Post Office Protocol (POP), Instant Message Access Protocol (IMAP), or the like. Hence, each message may be in the form of one or more packets, frames, or any other series of bits having the prescribed format. Messages may correspond to HTTP data transmissions, email messages, text messages, or the like.

According to one embodiment, the term "malware" may be construed broadly as any code or activity that initiates a malicious attack or any operations associated with anomalous or unwanted behavior. For instance, malware may correspond to a type of malicious computer code that executes an exploit to take advantage of a vulnerability, for example, to harm or co-opt operation of a network device or misappropriate, modify or delete data. In the alternative, malware may correspond to an exploit, namely information (e.g., executable code, data, command(s), etc.) that attempts to take advantage of a vulnerability in software and/or an action by a person gaining unauthorized access to one or more areas of a network device to cause the network device to experience undesirable or anomalous behaviors. The undesirable or anomalous behaviors may include a communication-based anomaly or an execution-based anomaly, which, for example, could (1) alter the functionality of a network device executing application software in an atypical manner (a file is opened by a first process where the file is configured to be opened by a second process and not the first process); (2) alter the functionality of the network device executing that application software without any malicious intent; and/or (3) provide unwanted functionality which may be generally acceptable in another context. In yet another alternative, malware may correspond to information that pertains to the unwanted behavior such as a process that causes data such as a contact list from a network (endpoint) device to be uploaded by a network to an external storage device without receiving permission from the user.

In certain instances, the terms "compare," "comparing," "comparison," or other tenses thereof generally mean determining if a match (e.g., a certain level of correlation) is achieved between two items where one of the items may include a particular pattern.

The term "network device" should be construed as any electronic device with the capability of processing data and connecting to a network. Such a network may be a public network such as the Internet or a private network such as a wireless data telecommunication network, wide area network, a type of local area network (LAN), or a combination of networks. Examples of a network device may include, but are not limited or restricted to, a laptop, a mobile phone, a tablet, a computer, standalone appliance, a router or other intermediary communication device, etc. Other examples of a network device includes a sensor (described above) as well as a computing node, namely hardware and/or software that operates as a network device to receive information from a sensor, and when applicable, perform malware analysis on that information.

The term "transmission medium" may be construed as a physical or logical communication path between two or more network devices (e.g., any devices with data processing and network connectivity such as, for example, a sensor, a computing node, mainframe, a computer such as a desktop or laptop, netbook, tablet, firewall, smart phone, router, switch, bridge, etc.) or between components within a network device. For instance, as a physical communication path, wired and/or wireless interconnects in the form of electrical wiring, optical fiber, cable, bus trace, or a wireless channel using infrared, radio frequency (RF), may be used.

The term "object" generally relates to content having a logical structure or organization that enables it to be classified for purposes of analysis for malware. The content may include an executable, a non-executable, or simply a collection of related data. The object may be retrieved from information in transit (e.g., a plurality of packets) or information at rest (e.g., data bytes from a storage medium). Examples of different types of objects may include a data element, one or more flows, or a data element within a flow itself.

Herein, a "flow" generally refers to related packets that are received, transmitted, or exchanged within a communication session, where multiple flows each being received, transmitted or exchanged within a corresponding communication session is referred to as a "multi-flow". A "data element" generally refers to as a plurality of packets carrying related payloads, e.g., a single webpage received over a network. The data element may be an executable or a non-executable, as described above.

Finally, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition may occur only when a combination of elements, functions, steps or acts are in some way inherently mutually exclusive.

As this invention is susceptible to embodiments of many different forms, it is intended that the present disclosure is to be considered as an example of the principles of the invention and not intended to limit the invention to the specific embodiments shown and described.

II. General Malware Detection Architecture

Referring to FIG. 1A, an exemplary block diagram of a distributed malware detection system 100 is shown. The malware detection system 100 comprises one or more sensors $110_1$-$110_M$ (M≥1) that are communicatively coupled to a centralized analysis system 140. Some or all of the centralized analysis system 140 may be located at an enterprise's premises (e.g., located as any part of the enterprise's network infrastructure whether located at a single facility utilized by the enterprise or at a plurality of facilities). As an alternative embodiment, some or all of the centralized analysis system 140 may be located outside the enterprise's network infrastructure, generally referred to as public or private cloud-based services that may be hosted by a cybersecurity provider or another entity separate from the enterprise (service customer). Obtaining a high degree of deployment flexibility, embodiments can also provide "hybrid" solutions, where the malware detection system 100 can include some of the centralized analysis system 140 located on premises and some as a cloud-based service. This provides optimal scaling with controlled capital expense as well as the ability to control location(s) of deployments to satisfy local requirements, e.g., as to sensitive information As shown in FIG. 1A, the sensors $110_1$-$110_M$ may be positioned at various locations on a transmission medium 115 that is part of the network 120 (e.g., connected at various ingress points on a wired network or positioned at various locations for receipt of wireless transmissions) and monitor data traffic propagating over the transmission medium 115. The "traffic" may include an electrical transmission of files, email messages, or the like. For instance, each sensor $110_1$-$110_M$ may be implemented either as a standalone network device, as logic implemented within a network device or integrated into a firewall, or as software running on a network device.

More specifically, according to one embodiment of the disclosure, the sensor $110_1$ may be implemented as a network device that is either coupled to the transmission medium 115 directly or communicatively coupled with the transmission medium 115 via an interface 125 operating as a data capturing device. According to this embodiment, the interface 125 is configured to receive the incoming data and subsequently process the incoming data, as described below. For instance, the interface 125 may operate as a network tap (in some embodiments with mirroring capability) that provides at least one or more data submissions (or copies thereof) extracted from data traffic propagating over the transmission medium 115. Alternatively, although not shown, the sensor $110_1$ may be configured to receive files or other objects automatically (or on command) accessed from a storage system. As yet another alternative, the sensor $110_1$ may be configured to receive data submissions which are not provided over the network 120. For instance, as an illustrative example, the interface 125 may operate as a data capturing device (e.g., port) for receiving data submissions manually provided via a suitable dedicated communication link or from portable storage media such as a flash drive.

As further shown in FIG. 1A, one sensor $110_1$ may be deployed individually or multiple sensors $110_1$-$110_M$ may be positioned in close proximity, perhaps sharing the same power source (e.g., common bus plane as described below). The sensors $110_1$-$110_M$ are configured to receive intercepted or copied data traffic and conduct an analysis on one or more packets within the data traffic to determine whether any packet or a set of related packets (flow or multi-flow) is suspicious. Such analysis may involve a determination as to whether any packets are sourced by or directed to a particular network device in a "blacklist" or a determination as to whether the body of the packet includes a certain data pattern. In the event that one or more of the packets are determined as suspicious, the monitoring sensor uploads a data submission, including metadata and an object for analysis, to the centralized analysis system 140.

Figure 1B:
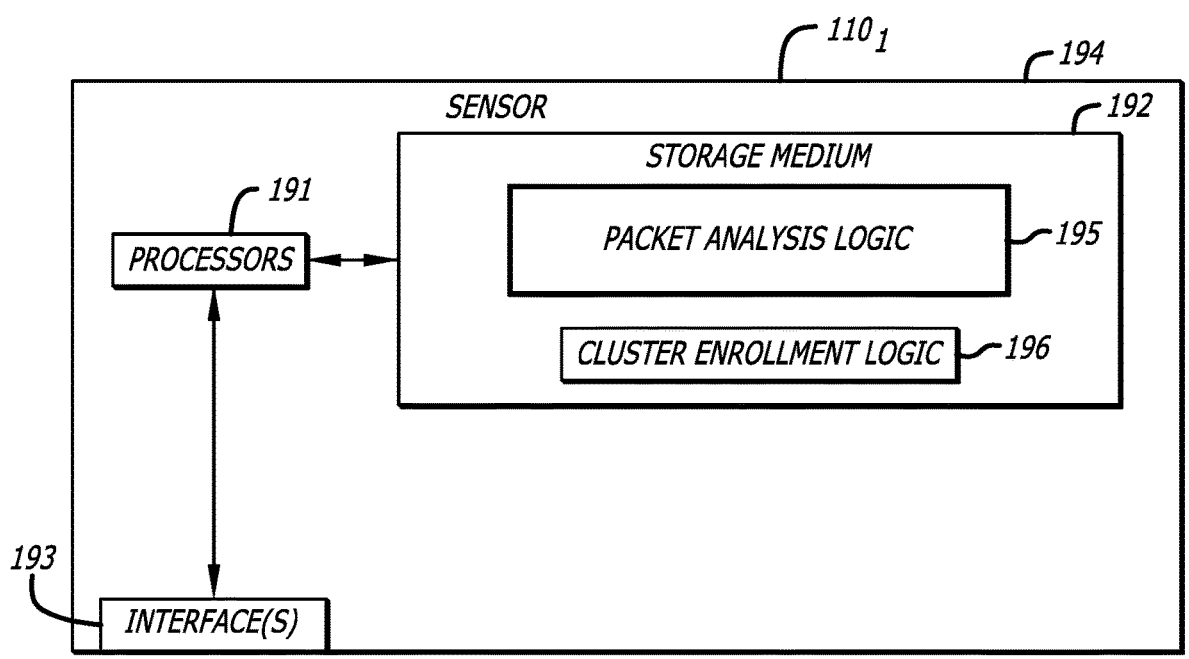
FIG. 1B is a block diagram of an exemplary embodiment of logic implemented within the sensor deployed within the malware detection system of FIG. 1A.

Although not shown, it is contemplated that the sensor $110_1$ may be implemented entirely as software for uploading into a network device and operating in cooperation with an operating system running on the network device. For this implementation, the software-based sensor is configured to operate in a manner that is substantially similar or identical to a sensor implemented as a network device as illustrated in FIG. 1B. Hence, the logic for the software-based sensor corresponds to software modules that, when executed by a processor implemented on a network device loaded with the software-based sensor, perform functions similarly to the functions performed by logic that is part of the sensor implemented as a network device.

As shown, the centralized analysis system 140 may be connected to the sensors $110_1$-$110_M$ over network 120 or a different network (e.g., a first network), and the clusters of computing nodes $150_1$-$150_N$ may be interconnected by a network (not shown), which may be network 120 or a second network (e.g., part of the first network or a different network than the first network). The network 120 may operate as part of a public network (internet) while the first and/or second networks may be part of a private network.

The centralized analysis system 140 features one or more clusters of computing nodes $150_1$-$150_N$ (N≥1), where the computing nodes are grouped in order to conduct collective operations for a set of sensors (e.g., sensors $110_1$-$110_M$). Each cluster $150_1$-$150_N$ may include computing nodes equipped for malware analysis, including behavioral monitoring, while executing (running) objects within one or more virtual machines (VMs). The virtual machines may have different guest image bundles that include a plurality of software profiles each with a different type of operating system (OS), application program, or both. Alternatively, each cluster $150_1$-$150_N$ may include computing nodes having identical guest image bundles that include software profiles directed to the same operating system (e.g., Windows® OS cluster, MAC® OS X cluster, etc.). Additionally, the cluster $150_1$-$150_N$ may be located to communicate with sensors within the same state, Provence, region or country to ensure compliance with governmental regulations.

As shown, for illustrative purposes, a cluster $150_1$ may include a plurality of computing nodes $160_1$-$160_P$ (P≥1). The plurality of computing nodes $160_1$-$160_P$ may be arranged in a "blade server" type deployment, which allows additional computing nodes to be seamlessly added to or removed from the cluster $150_1$ (e.g., computing nodes $160_1$-$160_P$ being connected to a common bus plane (network) that may provide both power and signaling between the computing nodes, a hot-swapping deployment of the computing nodes forming the cluster $150_1$, or any other deployment that allows a scalable computing node architecture). However, it is contemplated that any or all of clusters $150_1$-$150_N$ may be virtualized and implemented as software, where the computing nodes $160_1$-$160_P$ are software modules that communicate with each other via a selected communication protocol.

Additionally according to this embodiment of the disclosure, each of the clusters $150_1$-$150_N$ (e.g., cluster $150_1$) is communicatively coupled to a distributed data store 170 and a distributed queue 175. The distributed data store 170 and the distributed queue 175 may be provided through a separate memory node 180, which is communicatively coupled to and accessed by computing nodes $160_1$-$160_P$. For this embodiment, a data store 182 for storage of the malicious objects (hereinafter "object data store") may be provided in memory node 180. Alternatively, as shown, it is contemplated that the distributed data store 170 and the distributed queue 175 may be provided as a collection of synchronized memories within the computing nodes $160_1$-$160_P$ (e.g., synchronized data stores $170_1$-$170_P$ that collectively form distributed data store 170; synchronized queues $175_1$-$175_P$ that collectively form distributed queue 175 where each of the queues $175_1$-$175_P$ is synchronized to store the same information), each accessible by the computing nodes $160_1$-$160_P$ respectively. The distributed data store 170 (formed by local data stores $170_1$-$170_P$ operating in accordance with a selected memory coherence protocol) are accessible by the computing nodes $160_1$-$160_P$, and thus, data stores $170_1$-$170_P$ may be configured to store the same information. Alternatively, the data stores $170_1$-$170_P$ may be configured to store different information, provided the collective information is available to all of the computing nodes $160_1$-$160_P$ in the same cluster $150_1$.

Referring still to FIG. 1A, a management system 185 may be communicatively coupled to the computing nodes $160_1$-$160_P$, where such communications allow for an exchange of information. For instance, the management system 185 may be coupled to the interconnects 165, which provide coupling between the computing nodes $160_1$-$160_P$ of each of the clusters $150_1$-$150_N$. As a result, the management system 185 may be configured to receive local threat (malware) signatures generated by an object analysis system of a specific computing node (e.g., computing node $160_P$), and thereafter, proliferate these signatures to other computing nodes $160_1$-$160_{P-1}$ and/or other clusters $150_2$-$150_N$ throughout the malware detection system 100.

In order to provide sufficient processing capabilities to the sensors $110_1$-$110_M$ deployed throughout the network 120, the centralized analysis system 140 is scalable by allowing a flexible clustering scheme for computing nodes as well as allowing for the number of clusters to be increased or decreased in accordance with system processing capability. Stated differently, one or more computing nodes (e.g., computing node $160_{P+1}$) may be added to the cluster $150_1$ based on an increase in the current workload of the malware detection system 100. Likewise, one or more computing nodes may be removed from the cluster $150_1$, now forming computing nodes $160_1$-$160_{P-1}$, based on a decrease in the current workload.

As an optional feature, one or more of the clusters $150_1$-$150_N$ may be configured with reporting logic 184 to provide alerts to a customer such as a network administrator 190 of the customer for example, that identify degradation of the operability of that cluster. For example, the reporting logic (illustrated in FIG. 1 as "customer alert logic 184") may be configured to monitor metadata within at least one of the queue $175_1$ (when the contents of each queue $175_1$-$175_P$ are identical) for metadata approaching a timeout condition (e.g., where the amount of time that the metadata has been retained in the queue $175_1$, sometimes referred to as "metadata queuing time," exceeds a timeout value (e.g., the amount of time remaining to conduct a malware analysis on the object corresponding to the metadata). Herein, a selected time threshold (e.g. within a number of minutes, hours, etc.) is set for the cluster $150_1$, where the threshold may be a fixed time, a variable time that is based on cluster size or other factors such as subscription level or customer preference. Accordingly, upon detecting that a certain number of queued metadata entries will potentially experience a timeout condition within the selected time threshold, the customer alert logic 184 transmits an alert signal to the customer reporting a potential degradation in cluster performance. The alert signal identifies to the customer that procurement of additional computing nodes for the cluster $150_1$ may be warranted to avoid anticipated degradation in performance by the cluster $150_1$.

Referring to FIG. 1B, a block diagram of an exemplary embodiment of logic implemented within the sensor $110_1$ deployed within the malware detection system 100 of FIG. 1A is shown. For this embodiment, the sensor $110_1$ comprises one or more hardware processors 191 (referred to as "processor(s)"), a non-transitory storage medium 192, and one or more network interfaces 193 (e.g., wireless transceivers, wired connectors for network connectivity, etc.). These components are at least partially encased in a housing 194, which may be made entirely or partially of a rigid material (e.g., hard plastic, metal, glass, composites, or any combination thereof) that protects these components from environmental conditions. One example of processor(s) 191 may include an Intel® (x86) central processing unit (CPU) with an instruction set architecture. Alternatively, processor(s) 191 may include another type of CPUs, a digital signal processor (DSP), an Application Specific Integrated Circuit (ASIC), a field-programmable gate array (FPGA), or any other hardware component with data processing capability.

The processor(s) 191 is a multi-purpose, processing component that is configured to execute logic 195-196 maintained within the non-transitory storage medium 192 that is operating as a data store. As described below, the logic 195 may include, but is not limited or restricted to packet analysis logic that conducts an analysis of at least a portion of the intercepted or copied data traffic to determine whether an object within the data traffic is suspicious. This preliminary analysis is conducted to determine, at least for most data types, whether to provide the object to the computing nodes for more in-depth malware analysis. Additionally, the non-transitory storage medium 192 may include cluster enrollment logic 196 which, when executed, supports the handshaking signaling necessary for the sensor $110_1$ to join a cluster as well as support continued communications with an enrollment service and/or management system 185 to re-evaluate whether the sensor $110_1$ should remain in communication with a particular cluster, and more specifically, with a particular broker computing node, as shown in FIG. 1A.

III. Cluster Formation

Figure 2A:
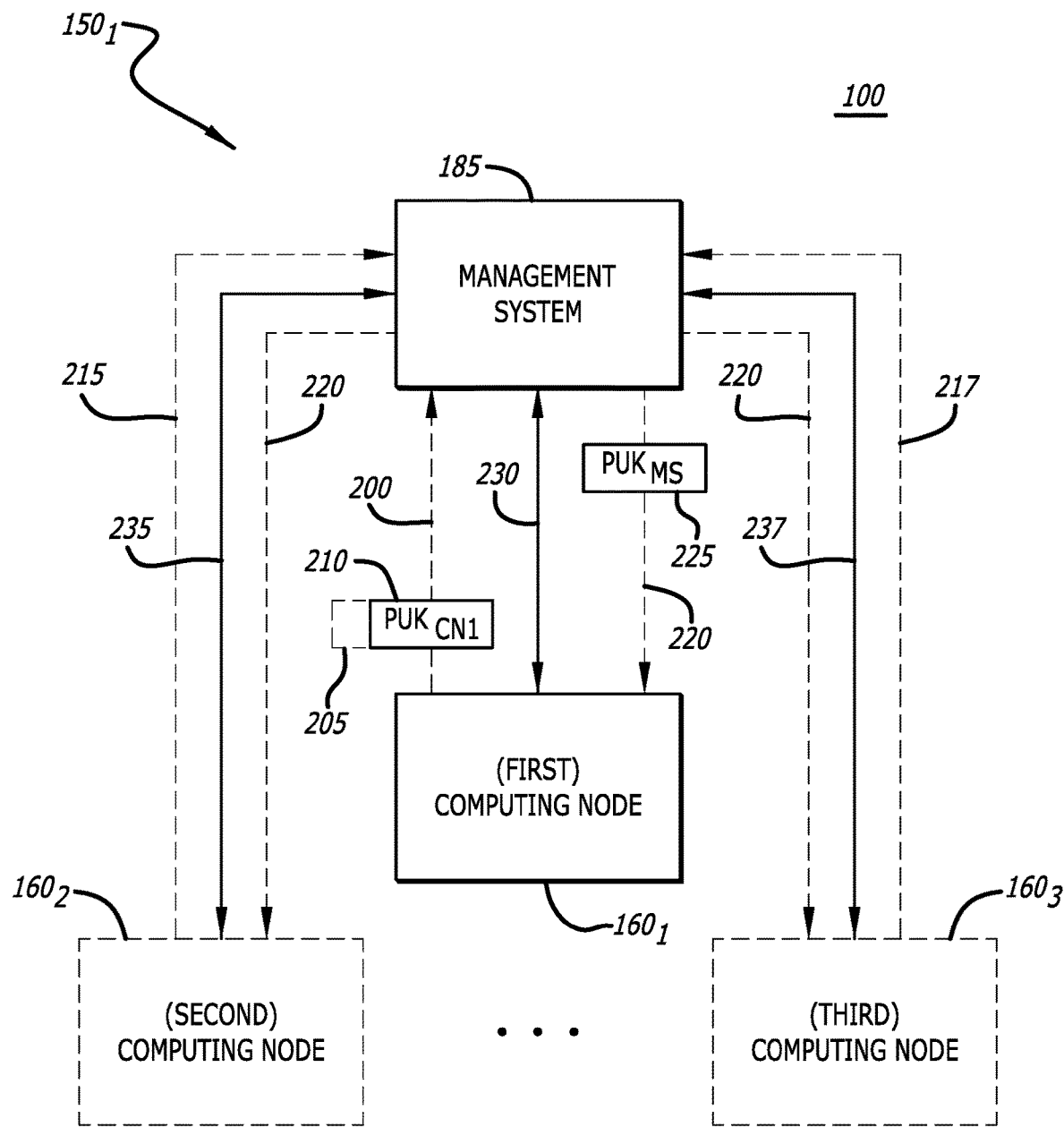
FIG. 2A is a block diagram of an exemplary embodiment of the formation of a cluster of computing nodes within the malware detection system of FIG. 1A.
Figure 6:
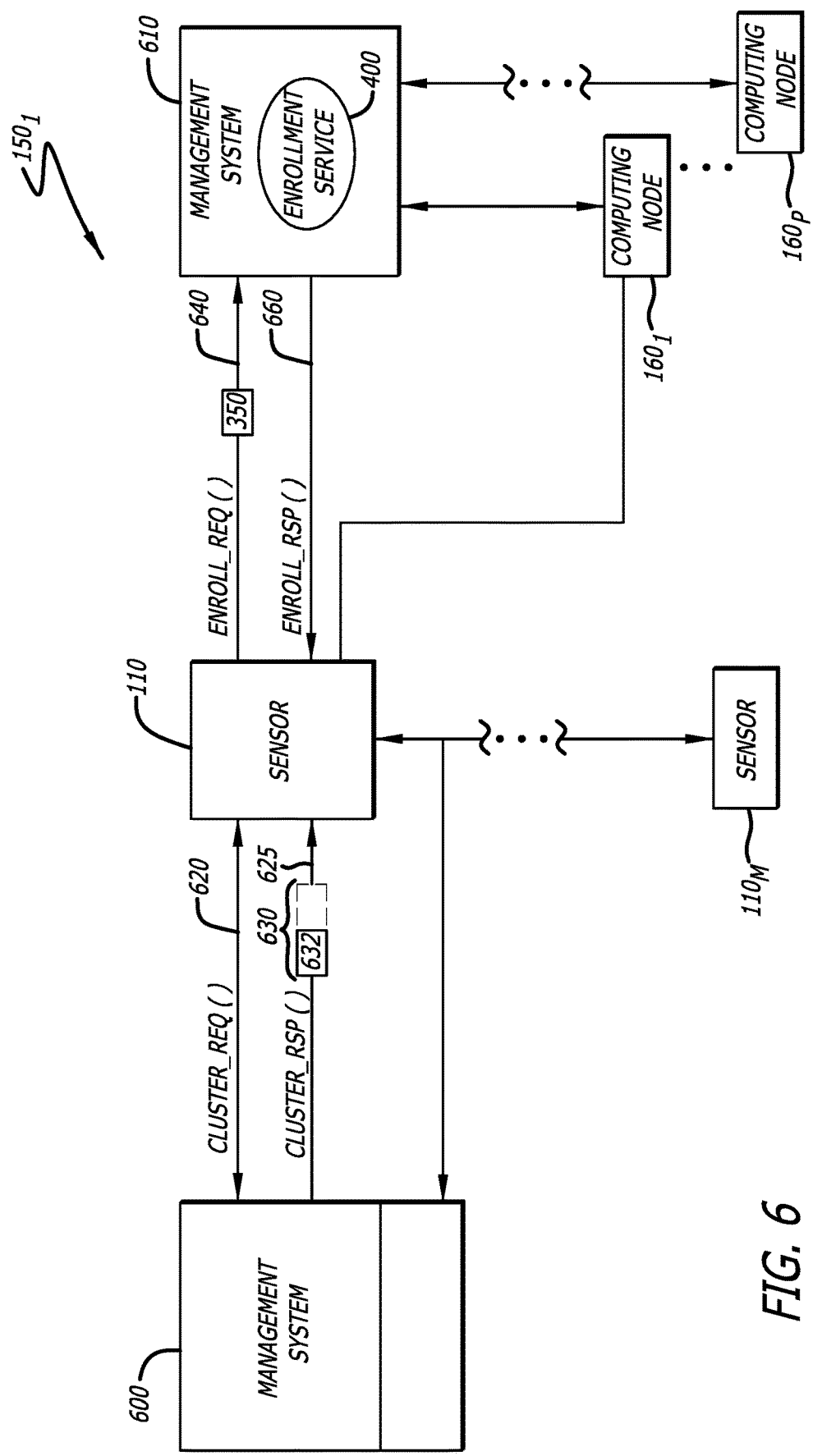
FIG. 6 is a block diagram illustrating an exemplary communication exchange between a sensor and multiple management systems for sensor enrollment for communications with an established cluster
Figure 7:
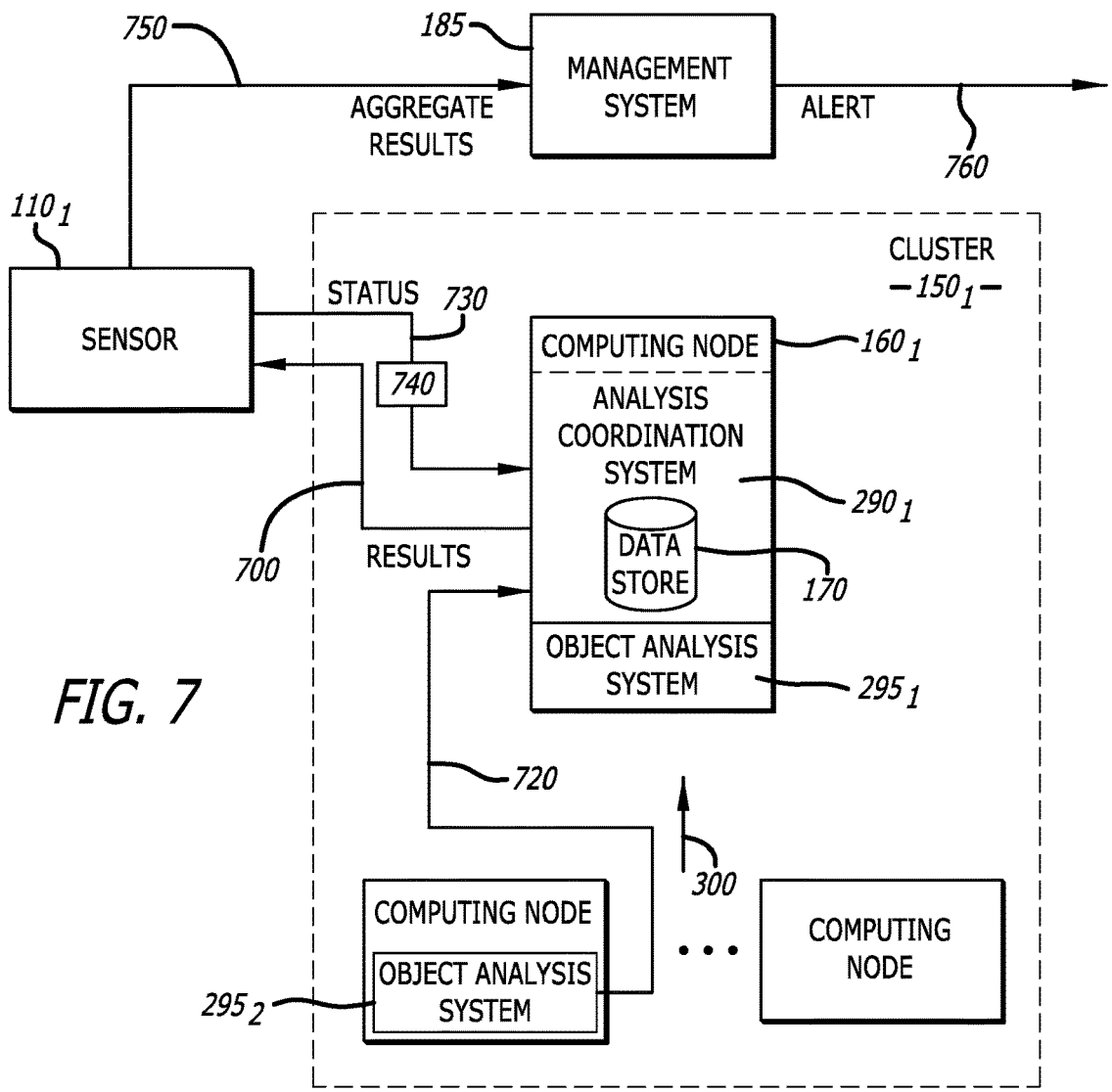
FIG. 7 is a block diagram of an exemplary embodiment of the handling of results produced by the object analysis system of the computing node and returned to the management system for reporting.
Figure 8:
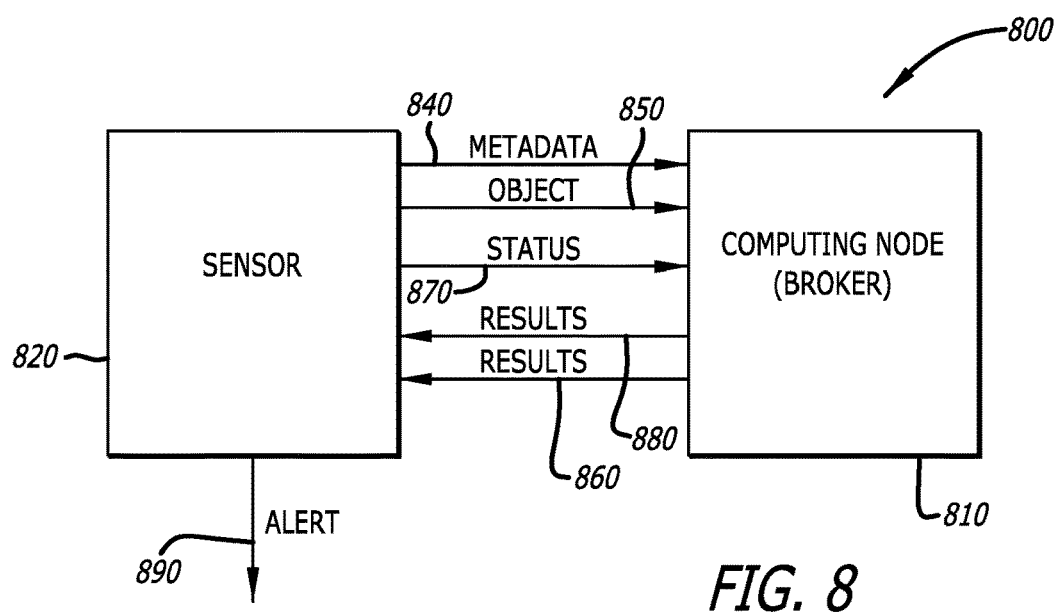
FIG. 8 is a block diagram of an exemplary embodiment of a cluster solely including a single broker computing node within a cluster that is in communication with a single sensor.

Referring to FIG. 2A, a block diagram of an exemplary embodiment of the formation of a cluster $150_1$ of computing nodes within the malware detection system 100 of FIG. 1A is shown, independent on whether the cluster formation is applicable to an asynchronous load balancing architecture of FIGS. 1-7 or a synchronous load balancing architecture of FIGS. 8-10. Herein, responsive to a triggering event (e.g., activation, installation within the malware detection system 100, receipt of signaling associated with workload re-balancing, etc.), a first computing node $160_1$ engages in a handshaking scheme with the management system 185. During the handshaking scheme, a credential exchange occurs between the management system 185 and the first computing node $160_1$.

As an illustrative example, during the handshaking scheme, the first computing node $160_1$ issues a request message 200 to the management system 185. The request message 200 includes authentication credentials 205 associated with the first computing node $160_1$. The authentication credentials 205 may include, but is not limited or restricted to a public key ($PUK_{CN1}$) 210 associated with the first computing node $160_1$. Additionally, or in the alternative, the authentication credentials 205 may include an identifier for the computing node (e.g., source media access control "MAC" address, assigned device name, etc.), an Internet Protocol (IP) address of the computing node, and/or an administrator password (in the event that requisite permission is needed from a network administrator for creating a cluster).

In response to receipt of the request message 200, the management system 185 may provide its authentication credentials 220 (e.g., at least its public key "$PUK_{MS}$" 225) to the first computing node $160_1$. As a result, both the first computing node $160_1$ and the management system 185 possess keying material for use in establishing secure communications for transmission of a message requesting to join a cluster of the malware detection system. One type of secure communications includes a secure channel 230 formed in accordance with a cryptographic, public-private key exchange protocol referred to as "Secure Shell" (SSH-2). The secure channel 230 is now used in the transmission of information between the management system 185 and the first computing node $160_1$.

In general, to establish secure communications, the same operations may be conducted for other newly added computing nodes, such as a second computing node $160_2$ and a third computing node $160_3$, where the management system 185 may utilize authentication credentials provided from the second computing node $160_2$ and the third computing node $160_3$ (e.g., $PUK_{CN2}$ 215 and $PUK_{CN3}$ 217) to establish secure communications 235 and 237 therewith.

Figure 2B:
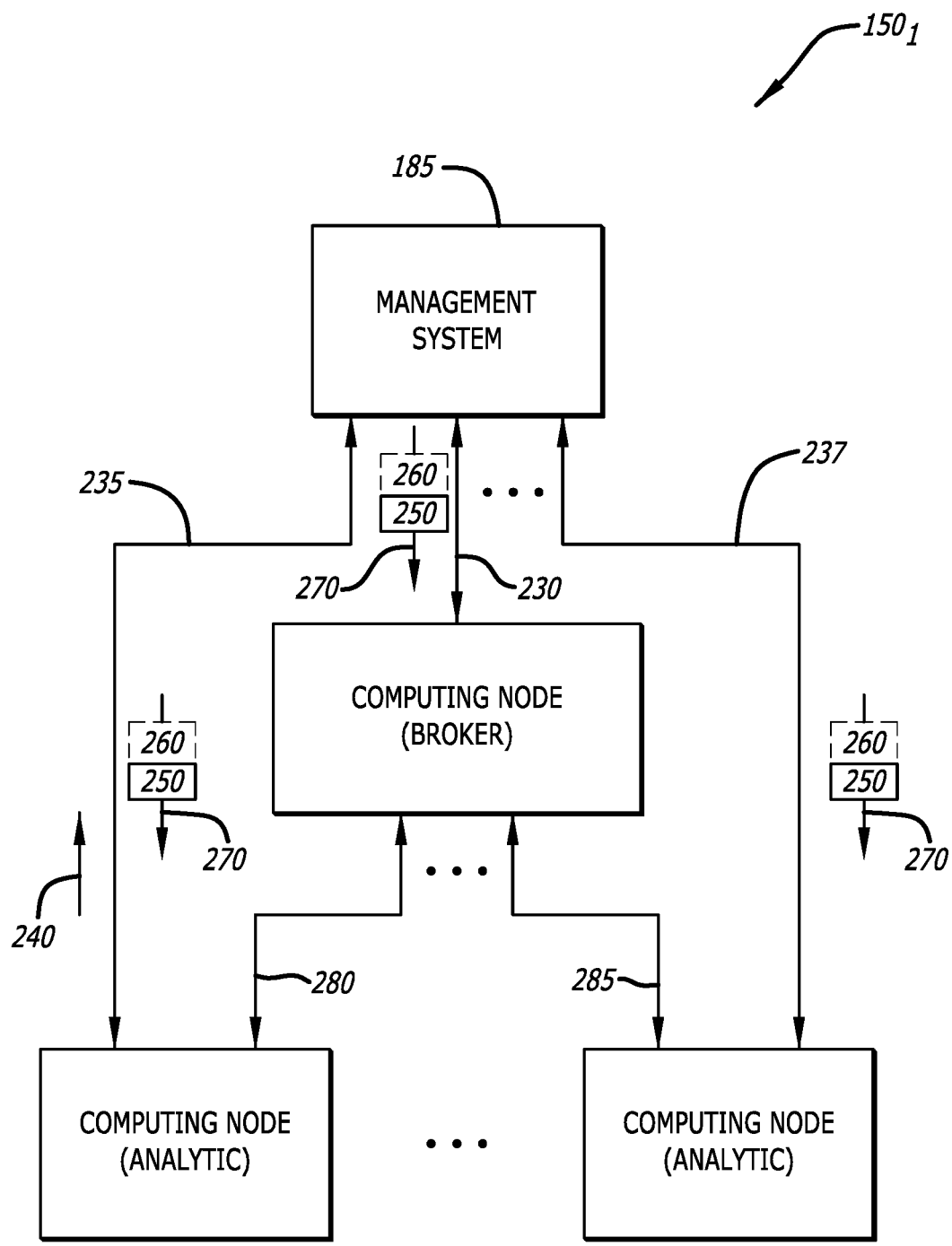
FIG. 2B is a block diagram of an exemplary embodiment of one of the computing nodes may seek to join a cluster of the malware detection system of FIG. 1A.

Expanding an existing cluster with an additional computing node will now be explained. More specifically, as shown in FIG. 2B, the second computing node $160_2$ may seek to join a cluster of the malware detection system 100 which has an active cluster $150_1$. More specifically, subsequent to the handshaking scheme described in FIG. 2A, the second computing node $160_2$ may initiate a request message 240 (obfuscated using $PUK_{MS}$ 225) over the secure channel 235 to join a cluster. In response to receipt of the request message 240, the management system 185 attempts, when applicable, to analyze the workload of each active cluster and/or certain features and capabilities of the computing nodes operating within the cluster. This analysis may involve a review of analytic data pertaining to the processing of suspicious objects (e.g., current processor utilization of each computing node within the cluster, number of timeout events representing delayed processing of the suspicious objects, etc.) and the features and capabilities of the cluster's computing nodes (e.g., object types supported, guest images supported, sensor types supported, geographic location, or subscription level supported where different computing nodes with potential different capabilities are assigned based on subscription level). Cluster selection may be performed by selection based on highest average processor utilization for the computing nodes within a cluster, highest maximum processor utilization by any computing node in a cluster, highest average or maximum of timeout events for a cluster, or the like.

Formation of a new cluster will now be described. Where the malware detection system 100 has no active clusters, the management system 185 may assign the second computing node $160_2$ to a newly formed cluster (e.g., cluster $150_1$) and add the public key of the second computing node $160_2$ ($PUK_{CN2}$) 215 to a stored listing of public keys 250 (hereinafter "public key listing 250") associated with the cluster $150_1$. The management system 185 maintains the public key listing 250 (e.g., an organized collection of public keys), which is used to identify all of the computing nodes that are part of the cluster $150_1$. Thereafter, the management system 185 provides the public key listing 250 to the second computing node $160_2$. It is contemplated that, upon creation of the cluster $150_1$, the management system 185 assigns an identifier 260 (e.g., string of alphanumeric characters that represent a name of the cluster $150_1$) for the cluster $150_1$. The cluster identifier 260 may be provided with the public key listing 250 as well.

Alternatively, where the second computing node $160_2$ is seeking to join one of a plurality of active clusters (i.e., where secure channels 230 and 237 have already been established prior to establishing secure channel 235), the management system 185 analyzes the workload for each active cluster, as described above. Based on the analyzed workload, the management system 185 assigns the second computing node $160_2$ to a selected cluster (e.g., cluster $150_1$) and adds the $PUK_{CN2}$ 215 of the second computing node $160_2$ to the public key listing 250 associated with the selected cluster $150_1$.

Additionally, the management system 185 provides one or more notification messages 270 to all computing nodes of the selected cluster $150_1$ (e.g., computing nodes $160_1$-$160_3$) of a change in the public key listing 250, which denotes expansion or contraction of the cluster $150_1$. The notification messages 270 include the public key listing 250 (i.e., as a link or the listing itself) to each of the computing nodes (e.g., computing nodes $160_1$-$160_3$) that are part of the cluster $150_1$. The notification messages 270 may be sent concurrently or sequentially. Alternatively, the notification messages 270 may merely notify the computing nodes $160_1$-$160_3$ of an updated publication of the public key listing 250, where the public key listing 250 is published and available for retrieval by the computing nodes (computing nodes $160_1$-$160_3$ as shown).

As a result, each of the computing nodes (e.g., computing nodes $160_1$-$160_3$ as shown) that collectively form the cluster $150_1$ has access to public key information associated with all other computing nodes within that cluster. Hence, depending on the assigned roles of the computing nodes as described below, a "broker" computing node (e.g., computing node $160_1$) is capable of establishing secured communications 280 and 285 with other computing nodes (e.g., computing nodes $160_2$ and $160_3$).

Hence, the assignment of role responsibility for the computing nodes is one of the operations performed when forming or adjusting the configuration of a cluster. Herein, the management system 185 may configure each computing node as either a "broker" computing node or an "analytic" computing node. A number of factors may be used by the management system 185 in determining what role to assign the computing node. Some of these factors may include, but are not limited or restricted to (i) public network (Internet) connectivity i.e. sensors enrolled with a cluster can be deployed in different geographical locations and these geographically distributed sensors must be able to access broker computing nodes over the Internet or WAN (however, 'analytic' computing nodes may not be exposed to the Internet or WAN); (ii) anticipated or current workload (e.g., queue utilization, processor utilization, number of analyses being conducted, ratio between number of analyses and timeout events, etc.); (iii) capability to replicate shared job queue across multiple broker computing nodes; (iv) capacity in terms of number of guest image instances or types of guest image instances supported; (v) types of guest-images supported (e.g., type/version of application program, type/version of operating system, etc.) especially where different computing nodes are dedicated to analysis of a certain object type in a certain operating environment (e.g., a single application/OS version, multiple application versions and single OS version, multiple application/OS versions, single application and multiple OS versions); (vi) geographical location (e.g., computing node in same geographic region as the sensor such as continent, country, region, district, county, state, etc.; and (vii) compatibility with different types of sensors (e.g., by model, by original equipment manufacturer, by storage capacity, by capability such as handling web traffic, email traffic, etc.); (ix) type of objects analyzed by the particular broker computing node (where certain nodes are dedicated to analysis certain object types (e.g., webpage/URL, emails), or (x) other factors that may influence the assignment.

Figure 2C:
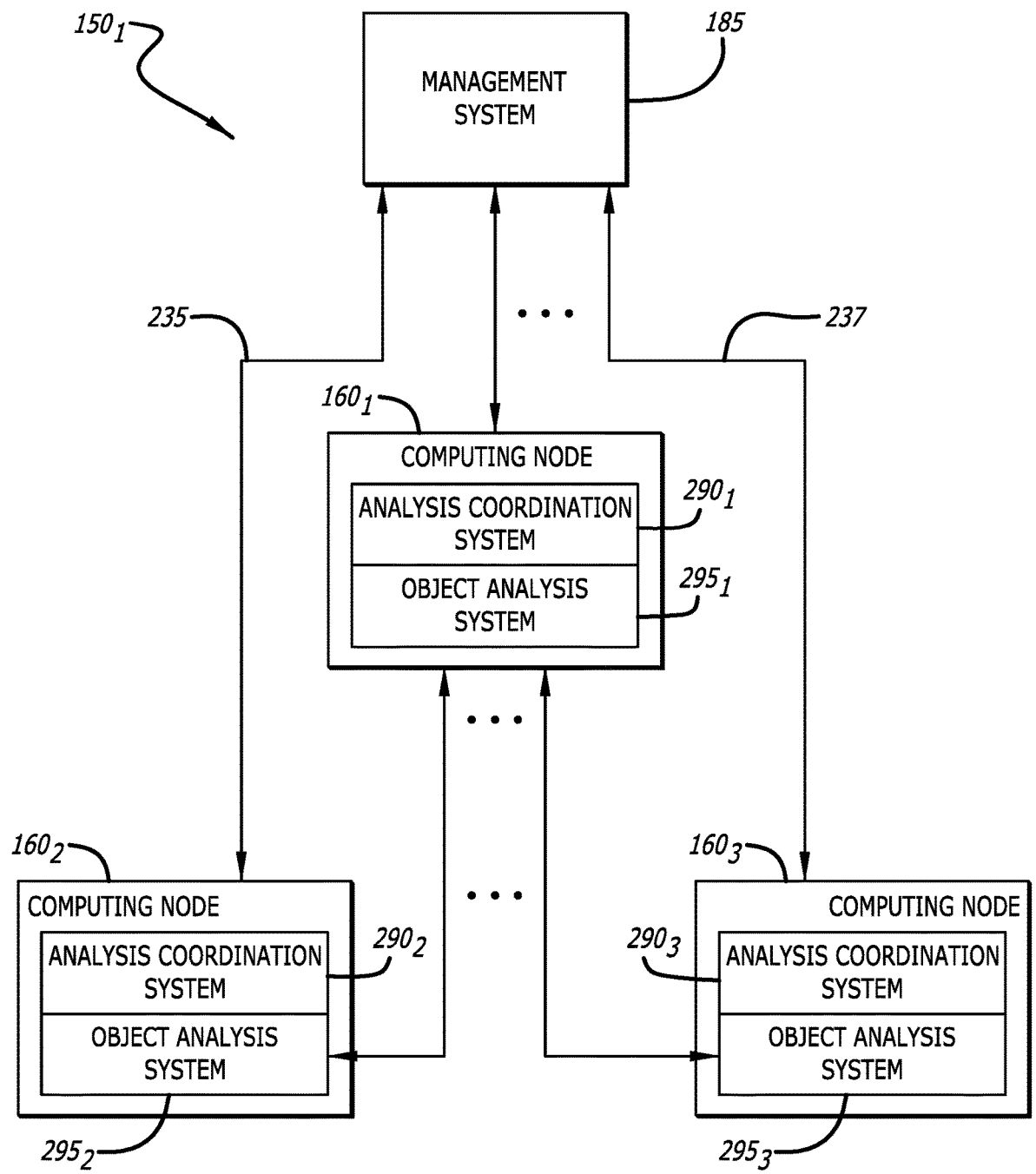
FIG. 2C is a block diagram of the logical composition of the computing node of FIGS. 2A-2B.

As shown in FIG. 2C, each computing node $160_1$-$160_3$ of FIGS. 2A-2B includes an analysis coordination system $290_1$-$290_3$ and an object analysis system $295_1$-$295_3$, respectively. As shown, the management system 185 may configure computing node $160_1$ as a "broker" computing node by enabling its analysis coordination system $290_1$. Similarly, the management system 185 may configure computing nodes $160_2$ and $160_3$ as "analytic" computing nodes by disabling (rendering inactive) their analysis coordination systems $290_2$ and $290_3$. Each cluster includes at least one "broker" computing node but for high-availability at least two broker computing nodes may be deployed.

Although not shown, an exemplary embodiment of a logical representation of the computing node $160_1$ is described. Herein, the computing node $160_1$ comprises one or more processors, one or more network interfaces, and logic associated with the analysis coordination system $290_1$ and the object analysis system $295_1$. The logic may be hardware, software stored in non-transitory storage medium, or firmware. These components may be virtualized software or components at least partially encased in a housing, which may be made entirely or partially of a rigid material. According to one embodiment of the disclosure, when the analysis coordination system $290_1$ is activated, the processor(s) supports communications between the analysis coordination system $290_1$ and any enrolled sensors (e.g., sensor $110_1$).

More specifically, when analysis coordination system $290_1$ is activated, the computing node $160_1$ is configured to operate as a "broker" computing node, namely a network device that is selected to directly communicate with any or all of the sensors that are assigned to use the cluster that conducts an in-depth malware analysis of a received suspicious object. As a "broker" computing node, the analysis coordination system $290_1$ of the computing node $160_1$ may be responsible for, inter alia, (i) assigning an identifier (e.g., an identifier unique to the domain) to incoming metadata that is associated with a suspicious object received from a sensor, and (ii) distributing the metadata to a distributed data store, where at least a portion of the metadata may be used by an object analysis system (within the broker computing node or another computing node) to obtain the suspicious object for analysis, as described in U.S. Patent Application entitled "SENSOR ARCHITECTURE FOR A SCALABLE MALWARE DETECTION SYSTEM" filed concurrently herewith (U.S. patent application Ser. No. 15/283,108), the entire contents of which are incorporated by reference.

Independent of its role ("broker" or "analytic"), each computing node $160_1$-$160_3$ includes an active, object analysis system $295_1$-$295_3$. An object analysis system is configured to conduct in-depth malware analysis on the object. Hence, although the analysis coordination systems $295_2$-$295_3$ of the computing nodes $160_2$-$160_3$ are inactive, the computing nodes $160_2$-$160_3$ are still able to analyze an incoming object to determine whether that object is associated with malware.

Of course, it is contemplated, as an alternative embodiment, that a "broker" computing node may have a logical architecture different than an "analytic" computing node. For example, a broker computing node may be configured with only an analysis coordination system. An analytic computing node may be configured with only an object analysis system.

IV. Enrollment Service

Figure 3:
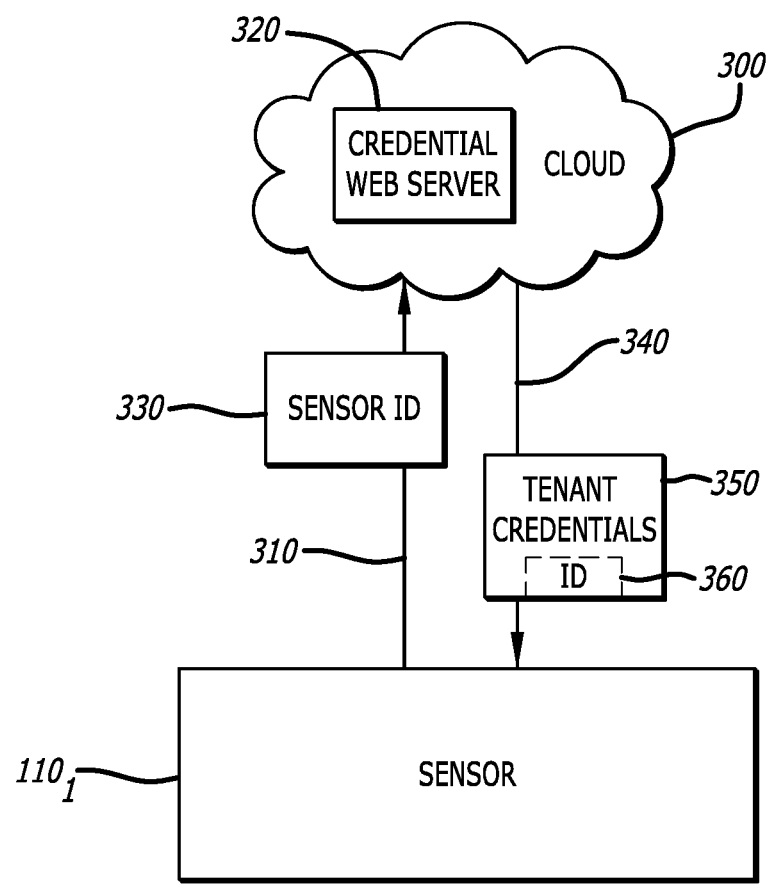
FIG. 3 is a block diagram of exemplary communications between a sensor and a cloud service to obtain tenant credentials for use in sensor enrollment with a cluster.

Referring now to FIG. 3, a block diagram of exemplary communications between the sensor $110_1$ and a cloud service 300 to obtain tenant credentials for use in sensor enrollment with a cluster is shown. Sensors, once deployed in a customer's environment, periodically call-home and fetch tenant (or customer) specific credentials and a globally unique tenant identifier (tenant ID). Prior to an attempt to establish secure communications with a cluster of the malware detection system 100, the sensor $110_1$ transmits a request message 310 for tenant credentials to a credential web server 320 within the cloud service 300. Based on information within the request message 310, the credential web server 320 identifies the sensor $110_1$ and assigns tenant credentials for use by the enrollment service for authenticating the sensor $110_1$. Sensor 110 uses tenant credentials and the unique tenant ID for authentication with an enrollment service such as the enrollment service 400 of FIG. 4A. The enrollment service is configured to validate tenant credentials directly with credential web server 320 for authorization to use a cluster.

The enrollment service 400 may be highly available in a variety of deployments. For instance, if the enrollment service 400 operates on the management system 185, it is contemplated that a redundant management system deployment may be utilized, where one management system works as a primary system while a second management system operates as a secondary/standby system. In the case of a failover (or takeover), the enrollment service 400 becomes available automatically on the secondary management system that now operates as the primary management system. Alternatively, the enrollment service 400 in the cloud is horizontally scalable against a single DNS name.

According to one embodiment of the disclosure, the sensor $110_1$ may automatically transmit the request message 310 upon activation or may transmit the request message 310 based on a manual setting by an administrator when configuring (or re-configuring) one or more clusters of the malware detection system. Besides providing addressing information (e.g., source IP address) that enables the credential web server 320 to return a response message 340, the request message 310 may include information 330 that uniquely identifies the sensor $110_1$, such as a device serial number, a source MAC address, or other unique identifier assigned by the particular original equipment manufacturer or software provider (e.g., hash value derived from information that uniquely identifies the sensor $110_1$). Herein, the request message 310 may be part of a handshaking protocol to establish secure communications (e.g., HTTPS, HTTP, etc.), and if so, keying material may accompany the request message 310 or may be provided prior to transmission of the request message 310. It is contemplated that the request message 310 may include or accompany information that identifies a customer associated with the sensor $110_1$, information that identifies a subscription level of the customer that may affect the features and capabilities returned to the sensor $110_1$, or the like.

As shown, the credential web server 320 is adapted to receive the request message 310 from the sensor $110_1$, and in response, extract the information 330 that uniquely identifies the sensor $110_1$. Upon obtaining the information 330, the credential web server 320 generates a tenant credentials 350 associated with the sensor $110_1$. The tenant credentials 350 includes a unique identifier (tenant ID) 360 that is used by the enrollment service for authentication of the sensor $110_1$, when the sensor $110_1$ seeks access to a particular cluster managed, at least in part, by the enrollment service. The unique identifier 360 may be generated based, at least in part, on the information provided with the request message 310, or may be generated randomly or pseudo-randomly by the credential web server 320. It is contemplated that the tenant credentials 350 may include information that identifies that the sensor $110_1$ (or entity associated with the sensor $110_1$) has an active subscription to the services offered by the cluster to which the sensor seeks access and the subscription level assigned to the sensor $110_1$.

It is contemplated that sensor $110_1$ may obtain the address of the enrollment service 400 using any number of techniques to set the address of the enrollment service 400 within the sensor $110_1$. For instance, as an illustrative example, the sensor $110_1$ may be configured (at manufacture or in the field) with a default address setting that includes a well-defined domain name server (DNS) as the public address of a public enrollment service. As another illustrative example, where the sensor $110_1$ is managed by the management system 185, the sensor $110_1$ may be configured with an address (e.g., IP address) of the management system 185, acquired from the management system 185 (described below), for use in lieu of the public address (DNS). As another illustrative example, the sensor $110_1$ may be configured by a network administrator who manually changes the enrollment service address to a desired address. Independent of the setting technique, the sensor $110_1$ is configured to support connectivity with the enrollment service 400.

A. Management Device Based Enrollment Service

Figure 4A:
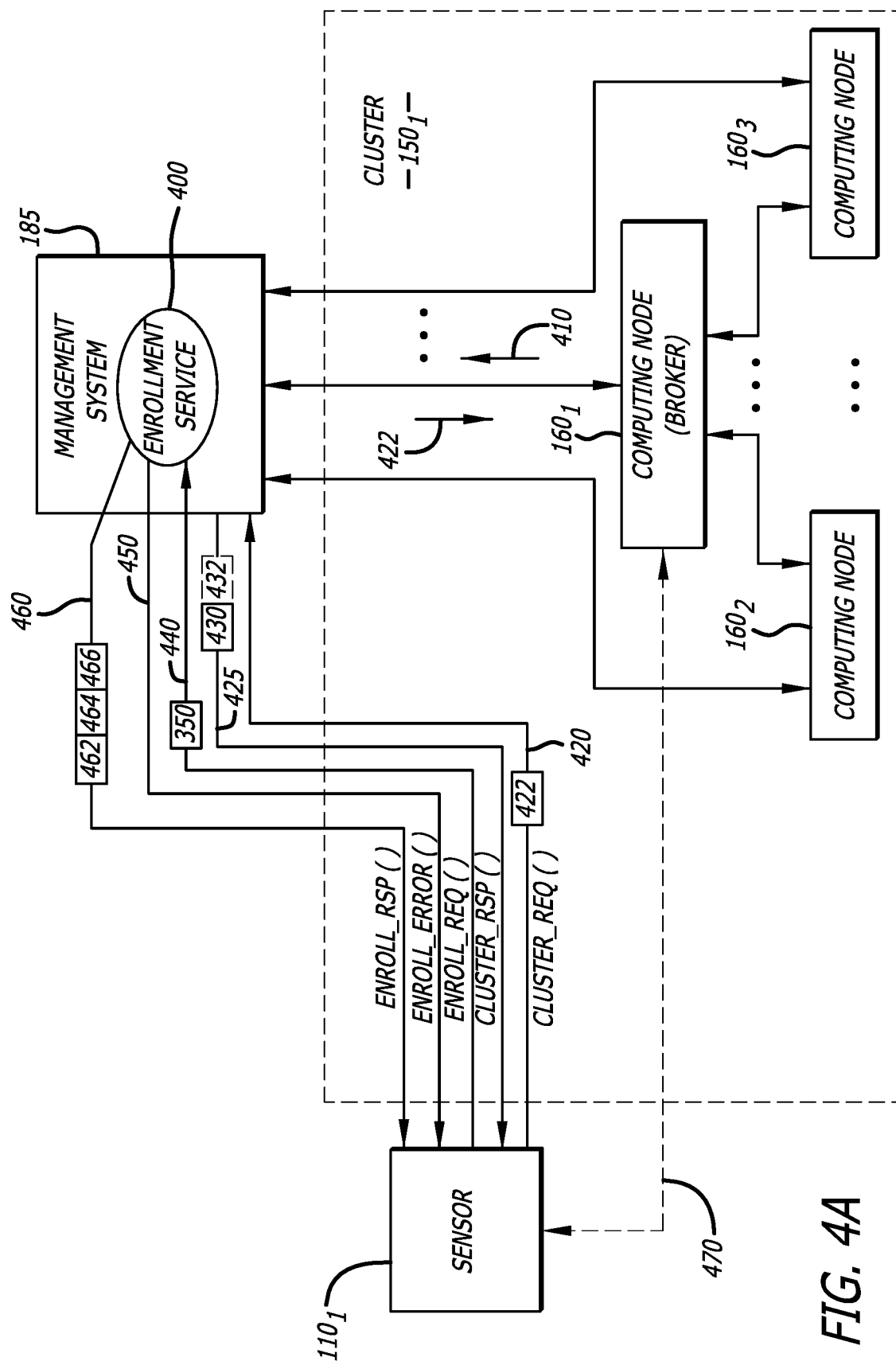
FIG. 4A is a block diagram illustrating an exemplary communication exchange between a sensor and an enrollment service provided by the management system of FIGS. 1 and 2A-2C.

Referring to FIG. 4A, a block diagram illustrating an exemplary embodiment of a communication exchange between sensor $110_1$ and an enrollment service 400 provided by the management system 185 is shown. Herein, each broker computing node within a cluster, such as broker computing node $160_1$ within the cluster $150_1$, is configured to advertise its features and capabilities 410 to the enrollment service 400 through unsolicited transmission (push) or solicited transmission from the computing node $160_1$ (pull). These features and capabilities 410 may include (i) the IP address for the broker computing node $160_1$, (ii) the host name of the broker computing node $160_1$, (iii) the host fingerprint that includes a public key ($PUK_{CN1}$) of the broker computing node $160_1$, and/or (iv) a connection load (e.g., number of sensors supported by the broker computing node $160_1$), (v) cluster location (geographic), (vi) cluster type (e.g. Production, POV, Beta etc.), (vii) supported sensor types/versions, (viii) cluster capacity (e.g., storage, supported transmission rates, maximum number of sensors supported, workload information such as current workload, maximum workload supported, or remaining workload available, etc.), (ix) supported types of guest-images, and/or (x) other features and capabilities in which a sensor can be interested in such as the particular object types supported. Some of these features and capabilities 410 can be uploaded into the computing node $160_1$ via a graphic user interface (GUI) or management console by a network administrator. It is noted that a sensor can request a cluster with a set of required and/or preferred capabilities or attributes and the enrollment service can perform matchmaking between sensor request and the advertised features of published clusters.

The advertised features and capabilities 410 (along with any other features and capabilities from other broker computing nodes) are maintained by the enrollment service 400. The enrollment service 400 considers one or more of the advertised features and capabilities of one or more computing nodes for selecting a particular broker computing node to support the sensor $110_1$ requesting access to cluster $150_1$. Upon selecting the particular broker computing node (e.g., broker computing node $160_1$), the enrollment service 400 returns at least a portion of the features and capabilities 410 to the requesting sensor $110_1$.

In particular, as shown in FIG. 4A, the sensor $110_1$ issues one or more request messages 420 (e.g., represented as "CLUSTER_REQ( ) message") to the management system 185 as part of the handshaking protocol for establishing communications with the cluster $150_1$. The CLUSTER_REQ( ) message 420 may include information 422 associated with the sensor $110_1$, such as the tenant credentials 350 of FIG. 3 and/or keying material that is used for establishing secure communications between the sensor $110_1$ and the management system 185.

In response to receipt of the CLUSTER_REQ( ) message 420 and after analysis of the features and capabilities of the available broker computing nodes, the management system 185 returns one or more response message 425 (e.g., represented as "CLUSTER_RSP( ) message") to the sensor $110_1$. The CLUSTER_RSP( ) message 425 provides address information 430 for accessing the enrollment service 400 where, according to this embodiment of the disclosure, the address information 430 may include an address (e.g., IP address) or a Domain Name System (DNS) name of the management system 185 as the address of enrollment service 400 that is available on the management system. Additionally, the CLUSTER_RSP( ) message 425 may further include keying material 432 associated with the management system 185 to establish secured communications (e.g., HTTPS secure channel) with the management system 185.

In a response to receipt of the CLUSTER_RSP( ) message 425, the sensor $110_1$ issues one or more enrollment request messages 440 (e.g., represented as "ENROLL_REQ( ) message") to the enrollment service 400 via the HTTPS secure channel, which may be established based on the exchange of keying material during the handshaking protocol (e.g., exchange of CLUSTER_REQ( ) message 420 and CLUSTER_RSP( ) message 425). The ENROLL_REQ( ) message 440 may include the tenant credentials 350 of FIG. 3. Upon receipt of the ENROLL_REQ( ) message 440, the enrollment service 400 extracts the tenant credentials 350 to authenticate the sensor $110_1$ and determine that the sensor $110_1$ is authorized to communicate with the cluster $150_1$.

More specifically, before selecting of the particular broker computing node, using a portion of the tenant credentials 350, the enrollment service 400 may conduct a subscription check of the sensor $110_1$ to determine whether the customer associated with the sensor $110_1$ has an active subscription to a particular service being requested (if not already conducted by the credential web server 320 of FIG. 3) and/or when the subscription is set to expire. The conveyance of the subscription information may be conducted through a variety of schemes, such as a message including a customer identifier and information that identifies subscription status. For example, the ENROLL_REQ( ) message 440 may include, separate or part of the tenant credentials 350, (i) a field that identifies a customer associated with the sensor $110_1$, (ii) a field that is set to a prescribed value when the sensor $110_1$ is associated with an active subscription, and/or (iii) a field that is set to identify an expiration time of the subscription or a duration of the subscription. As a result, the enrollment service 400 residing in a management system (see FIGS. 4A-4B and 6) or a web server (see FIG. 5) may be configured to monitor (periodically or aperiodically) the subscription status of the sensor $110_1$.

Herein, both the sensor $110_1$ and the enrollment service 400 may check if the subscription is active and update-to-date. As soon as any of them detects that the subscription is not active anymore, the sensor $110_1$ disconnects itself from the broker computing node $160_1$ of the cluster $150_1$ and sends an Un-enrollment request (not shown) to the enrollment service 400. Thereafter, the enrollment service 400 removes the authenticated keying material for the sensor $110_1$ from one or more broker computing nodes in communication with the sensor $110_1$. Once the sensor authenticated keying material is removed from the broker computing node $160_1$, the broker computing node $160_1$ will not accept the connections from the sensor $110_1$ until a new enrollment process for the sensor $110_1$ is conducted.

Additionally, besides whether the subscription is active for the sensor $110_1$, the enrollment service 400 may determine a type of subscription assigned to the sensor $110_1$. More specifically, the enrollment service may further determine the subscription level assigned to the sensor $110_1$ (e.g., basic with entry level malware analysis, premium with more robust malware analysis such as increased analysis time per object, increased guest images supported, prescribed quality of service greater than offered with basic subscription, access to computing nodes dedicated to processing certain object types, etc.). Such information may be relied upon for selection of the broker computing node by the enrollment service 400.

Where the sensor $110_1$ is not authenticated, the enrollment service 400 does not respond to the ENROLL_REQ( ) message 440 or returns a first type of enrollment response message 450 (e.g., represented as "ENROLL_ERROR( )" message as shown) that identifies the sensor $110_1$ has not been authenticated or not authorized. However, upon authenticating the sensor $110_1$, the enrollment service 400 is configured to forward (send) the keying material 422 associated with the sensor $110_1$ to the broker computing node $160_1$. The enrollment service 400 is also configured to return an enrollment response message 460 (e.g., represented as "ENROLL_RSP( ) message") to the sensor $110_1$. The ENROLL_RSP( ) message 460 includes a portion of features and capabilities 410 of the selected broker computing node (e.g., broker computing node $160_1$), such as the IP address 462 for the broker computing node $160_1$, the name 464 of the broker computing node $160_1$, and/or authentication information 466 (e.g., passwords, keying material, etc.) associated with the broker computing node $160_1$ of the cluster $150_1$.

Upon receipt of the portion of features and capabilities 410 for the selected broker computing node $160_1$, the sensor $110_1$ is now able to establish a secure communication path 470 to the broker computing node $160_1$. Thereafter, according to one embodiment of the disclosure, the sensor $110_1$ may submit metadata associated with any detected suspicious objects, where the broker computing node $160_1$ determines from the metadata whether a suspicious object has been previously analyzed, and if not, queues the metadata for subsequent use in retrieval of the suspicious object for an in-depth malware analysis by the broker computing node $160_1$ or in any of the computing nodes $160_2$ and $160_3$ that is part of the cluster $150_1$. The in-depth malware analysis may involve static, dynamic or emulation analysis, as generally described in U.S. Pat. No. 9,223,972, the entire contents of which are incorporated by reference.

Figure 4B:
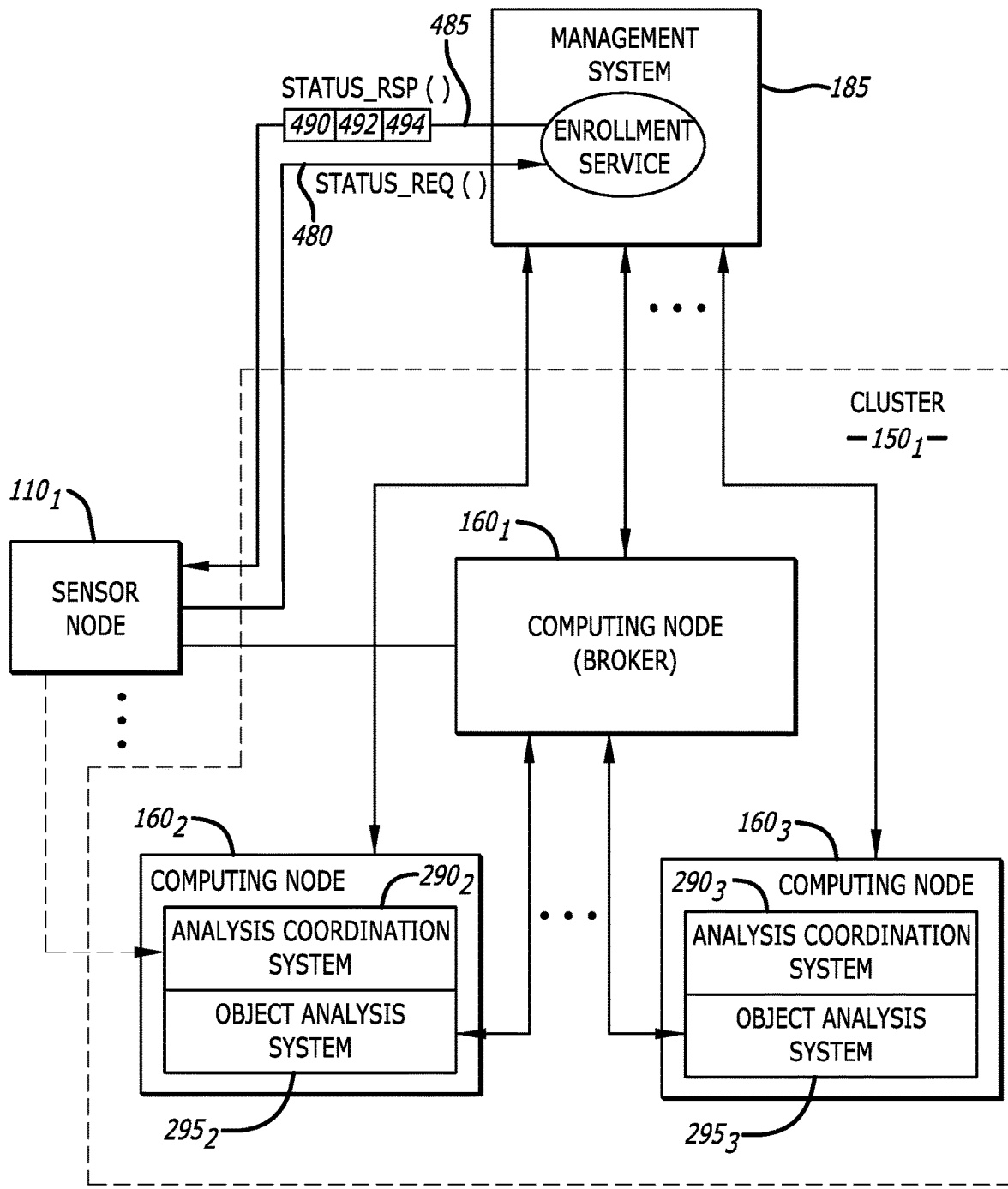
FIG. 4B is a block diagram illustrating an exemplary load rebalancing scheme between the sensor and enrollment service deployed within the management system of FIG. 4A.

Referring now to FIG. 4B, a block diagram illustrating an exemplary load rebalancing scheme between the sensor $110_1$ and enrollment service 400 deployed within the management system 185 is shown. Herein, the sensor node $110_1$ may periodically or aperiodically issue a Status Request message ("STATUS_REQ( )") 480 to the enrollment service 400. The Status Request message 480 is responsible for confirming that the sensor $110_1$ remains in communication with the cluster $150_1$ and, more specifically, the broker computing node $160_1$, as shown in FIG. 4B. When periodic, the Status Request message 480 may be issued in response to a predetermined amount of time (programmable or static) has elapsed since communications between the sensor $110_1$ and the broker computing node $160_1$ were established in order to potentially rebalance the sensor-broker assignments. When aperiodic, for example, the Status Request message 480 may be issued in response to a triggered event that causes reallocation of the sensor $110_1$ to a different broker computing node or different cluster within the malware detection system 100 for automatic rebalancing of sensors across multiple broker computing nodes. Examples of the triggering event may include, but is not limited or restricted to (i) a detected failure rate above a certain threshold experienced by the sensor $110_1$ such as failed communications with the broker computing node $160_1$, (ii) detected disconnectivity between the sensor $110_1$ and the broker computing node $160_1$, (iii) detected capacity levels (max or min thresholds) of the broker computing node $160_1$ have been reached, (iv) detected degradation in operation for the sensor $110_1$ and/or broker computing node $160_1$ that exceeds a threshold (e.g., reduced operability, failure, processor utilization exceeding a threshold, etc.), (v) non-compliance with subscription service levels (e.g., quality of service "QoS" levels, etc.) or (vi) other factors that would warrant re-evaluation of the sensor/broker configuration. Hence, the Status Request message 480 may be used to effectively re-enroll the sensor $110_1$ to the cluster $150_1$.

In the event that the workload of the broker computing node $160_1$ is substantially larger than another broker computing node within the cluster $150_1$, it is contemplated that the enrollment service 400 may redirect communications from the sensor $110_1$ to another broker computing node within the cluster $150_1$ (or even a different cluster) in lieu of the broker computing node $160_1$. In this regard, in response to receipt of the Status Request message 480, the enrollment service 400 issues a Status Response 485 ("STATUS_RSP( )"). The STATUS_RSP( ) message 485 may include a portion of features and capabilities for the same computing node $160_1$ or for another broker computing node selected to communicate with sensor $110_1$ (e.g., computing node $160_2$ with its analysis coordination system $290_2$ activated and operating as a broker computing node), such as the IP address 490 for the broker computing node $160_2$, (ii) the name 492 of the broker computing node $160_2$, and/or authentication information 494 (e.g., passwords, keying material, etc.) associated with the broker computing node $160_2$ of the cluster $150_1$.

B. Web-Based Enrollment Service

Figure 5:
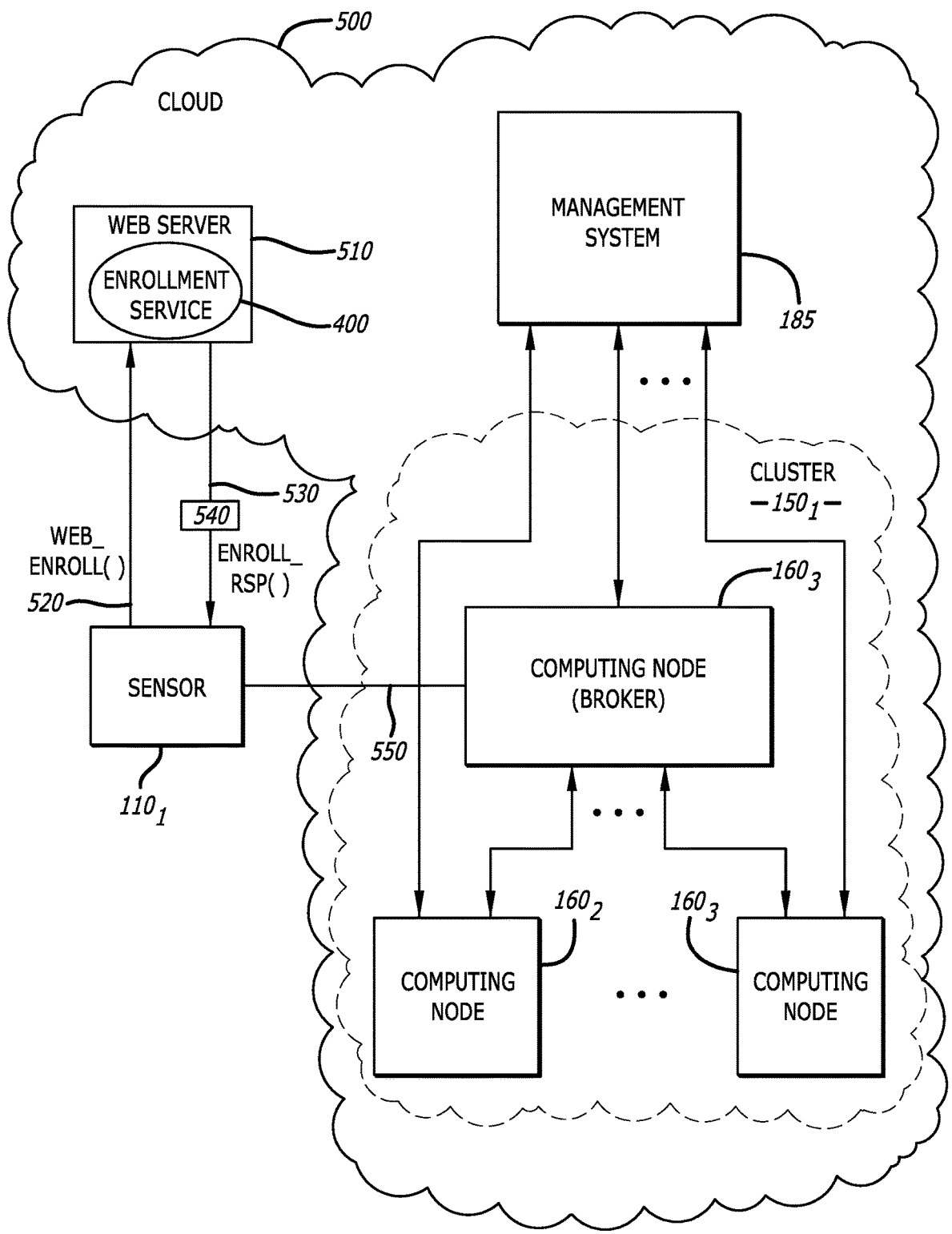
FIG. 5 is a block diagram of an exemplary embodiment of the enrollment service provided by a web server within a public or private cloud configuration.

Referring to FIG. 5, a block diagram of an exemplary embodiment of the enrollment service 400 that is provided by a web server 510 within a public or private cloud configuration 500 is shown. In contrast to sensor $110_1$ establishing communications with the management system 185 in order to obtain the location of the enrollment service 400 as illustrated in FIG. 4A, an address for accessing the enrollment service 400 within the public (or private) cloud 500 is published and made available to network devices having access to the cloud 500 (e.g., made available via dedicated communication sessions or broadcasts, electronic lookup at a dedicated website or IP address, etc.). Herein, although not shown, the enrollment service 400 is configured to receive information concerning the broker computing nodes via management system 185 or directly from the broker computing nodes (e.g., broker computing node $160_1$) with public network connectivity.

As shown in FIG. 5 (similar to FIG. 4A), the enrollment service 400 is configured to receive WEB_ENROLL_REQ( ) message 520 from the sensor $110_1$, where the WEB_ENROLL_REQ( ) message 520 includes the tenant credentials 350 as described above. In response, the enrollment service 400 returns a WEB_ENROLL_RSP( ) message 530. The WEB_ENROLL_RSP( ) message 530 includes a portion of features and capabilities 540 of a broker computing node selected by the enrollment service 400 (e.g., computing node $160_1$), such as the IP address 462 for the broker computing node $160_1$, (ii) the name 464 of the broker computing node $160_1$, and/or (iii) authentication information 466 (e.g., passwords, keying material, etc.) associated with the broker computing node $160_1$ of the cluster $150_1$, as previously described.

From the features and capabilities 540 of the selected broker computing node information contained in the WEB_ENROLL_RSP( ) message 530, the sensor node $110_1$ establishes a secure (HTTPS) communication path 550 with the selected broker computing node $160_1$ located in cloud 500. Thereafter, as described above, the sensor $110_1$ may submit metadata associated with any detected suspicious object, where the broker computing node $160_1$ determines from the metadata whether the suspicious object has been previously analyzed. If not, the broker computing node $160_1$ coordinates the retrieval of the suspicious object and the handling of an in-depth malware analysis of the suspicious object. The malware analysis may be performed by the broker computing node $160_1$ or any available computing node operating in the cluster $150_1$.

C. Multiple Management Device Based Enrollment Service

Referring to FIG. 6, a block diagram illustrating an exemplary communication exchange between the sensor $110_1$ and multiple management systems 600 and 610 is shown. Herein, according to this embodiment of the cluster $150_1$, a first management system 600 is configured to manage operability of the sensors $110_1$-$110_M$ while a second management system 610 is configured to manage the operability of the computing nodes $160_1$-$160_P$ forming cluster $150_1$.

In accordance with this embodiment of the disclosure, the enrollment service 400 is provided by the second management system 610. Being configured to manage sensor operability, the first management system 600 operates as a proxy for a request for enrollment service received from the sensors $110_1$-$110_M$. More specifically, the sensor $110_1$ issues one or more request messages 620 (herein, "CLUSTER_REQ( ) message") to the first management system 600, as described in FIG. 4A. In response to receipt of the CLUSTER_REQ( ) message 620, however, the management system 600 returns one or more response message 625 (herein, "CLUSTER_RSP( ) message") to the sensor $110_1$. The CLUSTER_RSP( ) message 625 provides address information 630 for accessing the enrollment service 400 operating as part of the second management system 610, where the address information 630 may include an IP address of the second management system 610 or DNS name of the second management system 610. Additionally, the CLUSTER_RSP( ) message 625 may include keying material 632 associated with the second management system 610 that allows the sensor $110_1$ to establish secured communications (e.g., HTTPS secure channel) with the second management system 610.

Thereafter, the sensor $110_1$ issues one or more enrollment request messages 640 (herein, "ENROLL_REQ( ) message") to the enrollment service 400, perhaps via the HTTPS secure channel pre-established between the sensor $110_1$ and the second management system 620. The ENROLL_REQ( ) message 640 may include the tenant credentials 350 of FIG. 3. Upon receipt of the ENROLL_REQ( ) message 640, the enrollment service 400 extracts the tenant credentials 350 to authenticate the sensor $110_1$ and determine whether the sensor $110_1$ is authorized to communicate with the cluster $150_1$.

Where the sensor $110_1$ is not authenticated, the enrollment service 400 does not respond to the ENROLL_REQ( ) message 640 or returns an enrollment response message that identifies a communication error (not shown), as described above.

However, upon authenticating the sensor $110_1$, the enrollment service 400 is configured to forward keying material 622 associated with the sensor $110_1$ to a broker computing node selected by the enrollment service 400 for operating in cooperation with sensor $110_1$ (e.g. broker computing node $160_1$). The enrollment service 400 is also configured to return an enrollment response message 660 (e.g., herein, "ENROLL_RSP( )" message) to the sensor $110_1$. The ENROLL_RSP( ) message 660 includes a portion of features and capabilities 410 of the selected broker computing node (e.g., broker computing node $160_1$), as described above.

Thereafter, the sensor $110_1$ is in secure communications with broker computing node $160_1$ to receive metadata and corresponding suspicious objects for malware analysis.

V. Operability Management

Referring now to FIG. 7, a block diagram of an exemplary embodiment of the handling of results 700 produced by the object analysis system $295_1$ of the computing node $160_2$ is shown. Herein, the results 700 include information that identifies whether a suspicious object, provided by the sensor $110_1$ to the object analysis system $295_2$ of the computing node $160_2$ for analysis, is associated with malware. The results 700 are stored in the distributed data store 170 that is accessible to all of the computing nodes $160_1$-$160_3$, including broker computing node $160_1$ that is communicatively coupled to the "analytic" computing node $160_2$ via a (secure) communication path 720.

Herein, the sensor $110_1$ may be configured to transmit status messages 730 to the broker computing node $160_1$. The transmission of the status messages 730 may be periodic or aperiodic in response to a triggering event such as a timeout event that denotes expiration of a time period allocated for the malware analysis of a particular suspicious object. In response to receipt of the status message 730, the broker computing node $160_1$ extracts information from the status message 730, namely a unique identifier 740 associated with the submitted suspicious object. Using the identifier 740, the broker computing node $160_1$ accesses the distributed data store 170 recover analysis results 700 performed by status analysis logic, dynamic analysis logic or emulation analysis logic within the object analysis system $295_2$ of the computing node $160_2$ to determine whether or not the suspicious object is associated with malware.

Upon determining that the results 700 for the identified suspicious object have been produced and are stored in the distributed data store 170, the broker computing node $160_1$ transmits the results 700 to the sensor $110_1$. Upon receipt of the results 700, the sensor $110_1$ may provide an aggregate of the analysis results (referred to as "aggregation results 750"), which includes results 700, to the management system 185. It is contemplated that, as an alternative embodiment, the broker computing node $160_1$ may transmit at least a portion of the results 700 to the management system 185 in lieu of transmission via the sensor $110_1$.

Based on the content of the aggregated analysis results 700, the management system 185 may generate an alert 760 via a wired or wireless transmitter (not shown) to notify a network administrator (see FIG. 1A) or other entities as to the detection of malware. Additionally, or in the alternative, the management system 185 may provide at least a portion of the results 700 to another management system (not shown) that monitors the health and operability of the network 120 or to a forensics analysis system for further detailed analysis as to confirm that the suspicious object is associated with malware and the nature of the malware. Also, the management system 185 may receive a signature generated by the computing node $160_2$ during analysis of the suspicious object as part of the aggregated analysis results 750, or may generate a signature for propagation through the enterprise network 120 of FIG. 1A.

Referring to FIG. 8, a block diagram of an exemplary embodiment of a cluster 800 solely including a single broker computing node 810 (e.g., broker computing node $160_1$ of FIG. 1A) in communications with a single sensor 820 (e.g., sensor $110_1$ of FIG. 1A) is shown. Herein, the sensor 820 provides metadata 840 associated with a suspicious object 850 to the broker computing node 810 (analysis coordination system), which determines from the metadata 840 whether or not the suspicious object 850 has been analyzed. If so, the results 860 from the prior analysis are provided to the sensor 820.

In the event that the metadata 840 indicates that the suspicious object 850 has not been analyzed, the broker computing node 810 obtains the metadata 840 and utilizes the metadata 840 to obtain the suspicious object 850. The suspicious object 850 may be stored in a local data store of the sensor 820 or in a data store accessible by the sensor 820.

Upon receipt of the suspicious object 850, the broker computing node 810 (object analysis system) conducts one or more analyses (e.g., static analysis, dynamic analysis, and/or emulation analysis) on the suspicious object 850 to determine whether the suspicious object 850 is associated with malware. If so, results 880 from the one or more analyses are stored within the distributed data store 170, which is accessible by the sensor 820 through one or more status messages 870, as illustrated as status messages 730 in FIG. 7. In response to a determination that the results 880 are present in the distributed data store 170 and are available for retrieval, the broker computing node 810 returns the results 880 to the sensor 820, which includes logic that can issue alerts 890 in lieu of the alerts being issued by the management system 185 of FIG. 7.

In the foregoing description, the invention is described with reference to specific exemplary embodiments thereof. However, it will be evident that various modifications and changes may be made thereto without departing from the broader spirit and scope of the invention as set forth in the appended claims.

What is claimed is:

1. A computerized method for enrollment of a sensor for communications with a selected computing node of a cluster operating within a malware detection system, comprising:
   receiving advertised features and capabilities for one or more broker computing nodes within the cluster by an enrollment service operating within a management system;
   sending a first message to a sensor by the management system, the first message includes address information associated with the enrollment service;
   in response to the first message, receiving a second message from the sensor, the second message includes tenant credentials that includes an identifier for the sensor for use by the enrollment service in authenticating the sensor;
   determining a selected computing node for communications with the sensor based on consideration of the features and capabilities for the one or more broker computing nodes within the cluster and the tenant credentials associated with the sensor; and
   upon authenticating the sensor by the enrollment service, sending keying material associated with the sensor to the selected computing node operating as a first broker computing node of the one or more broker computing nodes and sending a portion of the advertised features and capabilities associated with the first broker computing node to the sensor.

2. The computerized method of claim 1, wherein the sending of the keying material associated with the sensor to the selected computing node and the sending of the portion of the advertised features and capabilities associated with the first broker computing node to the sensor enables the sensor to establish a secure communication path with the first broker computing node, wherein the secure communication path allows the sensor to operate in cooperation with the first broker computing node by conducting a preliminary evaluation of an object, being a portion of information received by the sensor over a network, to determine whether the object is suspicious and provide the object to the first broker computing node for in-depth malware analysis by the cluster.

3. The computerized method of claim 1, wherein the enrollment service includes a daemon application running on the management system.

4. The computerized method of claim 1 further comprising:
   receiving a third message by the enrollment service from the sensor in response to a triggering event, the third message being used by the enrollment service to assess whether the sensor is to continue communications with the cluster via the first broker computing node; and
   redirecting the sensor to a second broker computing node different than the first broker computing node for subsequent communications with the cluster, the redirecting of the sensor includes transmitting a fourth message that includes advertised features and capabilities for the second broker computing node within the cluster.

5. The computerized method of claim 4, wherein the triggering event includes expiration of an amount of time during which the sensor is in communication with the first broker computing node.

6. The computerized method of claim 4, wherein the triggering event includes detected degradation in operability of the first broker computing node by the sensor.

7. The computerized method of claim 6, wherein the degradation of operability includes a rate of communication failures between the sensor and the first broker computing node exceeding a prescribed threshold.

8. The computerized method of claim 4, wherein the triggering event includes non-compliance with a subscription service level associated with the sensor.

9. The computerized method of claim 1, wherein prior to sending the first message to the sensor, the method further comprises
   receiving a message from the sensor, the message requesting to join the cluster; and
   conducting a subscription check on the sensor to determine whether a customer associated with the sensor has an active subscription to a particular service provided by the cluster.

10. The computerized method of claim 1, wherein prior to sending the first message to the sensor and after receiving the message requesting to join the cluster, the method further comprises
    determining a subscription level assigned to the sensor, the subscription level being used as a factor for selection of the selected computing node as the first broker computing node.

11. A computerized method for enrollment of a sensor for communications with a selected computing node of a cluster operating within a malware detection system, comprising:
    authenticating the sensor by an enrollment service;
    upon authenticating the sensor by the enrollment service, selecting a computing node to operate as a first broker computing node for communications between the cluster and the sensor based on consideration of features and capabilities for one or more broker computing nodes including the first broker computing node within the cluster and information provided by the sensor for authenticating the sensor; and
    sending keying material associated with the sensor to the selected computing node operating as the first broker computing node and sending a portion of advertised features and capabilities associated with the first broker computing node to the sensor for use an establishment of a secure communication path between the sensor and the first broker computing node.

12. The computerized method of claim 11 further comprising:
- establishing of the secure communication path between the sensor and the first broker computing node; and
- conduct, by the sensor, a preliminary evaluation of an object that includes a portion of information received by the sensor over a network, the preliminary evaluation to determine whether the object is suspicious and provide the suspicious object to the first broker computing node for in-depth malware analysis by the cluster.

13. The computerized method of claim 11, wherein the enrollment service that authenticates the sensor is deployed in a web server separate from the cluster that includes the first broker computing node.

14. The computerized method of claim 11, wherein the portion of features and capabilities associated with the first broker computing node includes (i) an IP address for the first broker computing node, or (ii) a name of the first broker computing node, or (iii) authentication information associated with the first broker computing node of the cluster.

15. The computerized method of claim 11, wherein the keying material includes a public key of the sensor.

16. The computerized method of claim 11, wherein prior selecting the computing node, the method further comprises
- receiving a message from the sensor, the message requesting to join the cluster; and
- conducting a subscription check of the sensor to determine whether a customer associated with the sensor has an active subscription to a particular service provided by the cluster.

17. The computerized method of claim 16, wherein after conducting the subscription check and prior to sending the keying material associated with the sensor to the selected computing node and sending the portion of the advertised features and capabilities associated with the first broker computing node to the sensor, the method further comprising
- determining the selected computing node for communications with the sensor based on consideration of the features and capabilities for the one or more broker computing nodes within the cluster and the tenant credentials of the sensor.

18. The computerized method of claim 16, wherein prior selecting the computing node, the method further comprises
- determining a subscription level assigned to the sensor, the subscription level being used as a factor for selection of the selected computing node as the first broker computing node.

19. A system comprising:
- a sensor to (i) receive information over a network, the sensor to conduct a preliminary evaluation of one or more objects each including a portion of the information received by the sensor and (ii) determine whether any of the one or more objects is suspicious;
- a first computing node; and
- a management system communicatively coupled to the sensor and the first computing node, the management system includes an enrollment service that (i) receives advertised features and capabilities for the first computing node and tenant credentials from the sensor, (ii) provides address information associated with the enrollment service to the sensor, (iii) determines the first computing node for communications with the sensor based on consideration of the features and capabilities for one or more computing nodes within a cluster including the first computing node and the tenant credentials associated with the sensor, (iv) receives and forwards keying material associated with the sensor to the first computing node upon authentication of the sensor, and (v) provides a portion of the advertised features and capabilities associated with the first computing node to the sensor to enable the sensor to establish a secure communication path with the first computing node.

20. The system of claim 19, wherein the first computing node is one of a plurality of computing nodes forming the cluster operating within a malware detection system to perform malware analysis on a suspicious object provided by the sensor, at least the first computing node operating as a broker computing node for the cluster.

21. The system of claim 19, wherein the enrollment service includes a daemon application running on the management system.

22. The system of claim 19, wherein the enrollment service is operating within a public or private cloud.

23. The system of claim 19, wherein the portion of the advertised features and capabilities associated with the first computing node includes a public key of the first computing node and a number of sensors supported by the first computing node operating as a broker computing node.

24. The system of claim 19, wherein the portion of the advertised features and capabilities associated with the first computing node includes a geographical location of the cluster including the first computing node.

25. The system of claim 19, wherein the portion of the advertised features and capabilities associated with the first computing node includes a capacity of the cluster including the first computing node.

26. The system of claim 19, wherein the portion of the advertised features and capabilities associated with the first computing node identifies sensor types supported by the enrollment service.

27. The system of claim 19, wherein the enrollment service of the management system to provide the address information associated with the enrollment service that includes an Internet Protocol address or a Domain Name System name of the management system.

28. The system of claim 19, wherein the enrollment service further (i) receives a first message from the sensor in response to a triggering event for use in determining whether the sensor is to continue communications with the cluster via the first computing node operating as a broker computing node, and (ii) redirects the sensor to a second computing node operating as a broker computing node that is different than the first computing node for subsequent communications with the cluster, the fourth message includes advertised features and capabilities for the second computing node.

29. The system of claim 28, wherein the triggering event includes expiration of an amount of time during which the sensor is in communication with the first computing node.

30. A computerized method for enrollment of a sensor for communications with a selected computing node of a cluster operating within a malware detection system, comprising:
- receiving a request for join the cluster from a sensor;
- analyzing information associated with a subscription for the sensor for services provided by the cluster; and
- upon determining (i) that the subscription for the sensor is active by the enrollment service and (ii) a selected computing node for communications with the sensor based on consideration of features and capabilities for one or more broker computing nodes within the cluster and tenant credentials associated with the sensor, sending information associated with the sensor to the selected computing node operating as a first broker computing node of the one or more broker computing nodes and sending a portion of the advertised features and capabilities associated with the first broker computing node to the sensor.

31. The computerized method of claim 30, wherein the analyzing of the information associated with the subscription for the sensor includes analysis of a level of subscription assigned to the sensor, the level of subscription may be used as a factor by the enrollment service in selecting the selected computing node.

32. The computerized method of claim 30, wherein the sending of the portion of the advertised features and capabilities from the enrollment service to the sensor comprises sending one or more of (i) an address of the selected computing node, (ii) a name of the selected computing node, or (iii) information for authenticating the sensor to the selected computing node of the cluster.

\* \* \* \* \*